(12) United States Patent
Kirovski et al.

(10) Patent No.: US 9,135,948 B2
(45) Date of Patent: Sep. 15, 2015

(54) OPTICAL MEDIUM WITH ADDED DESCRIPTOR TO REDUCE COUNTERFEITING

(75) Inventors: Darko Kirovski, Kirkland, WA (US); David E. Evans, Charlottesville, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1115 days.

(21) Appl. No.: 12/497,571

(22) Filed: Jul. 3, 2009

(65) Prior Publication Data

US 2011/0002209 A1    Jan. 6, 2011

(51) Int. Cl.
*G06Q 99/00* (2006.01)
*G11B 20/00* (2006.01)
*G06Q 30/00* (2012.01)

(52) U.S. Cl.
CPC ...... *G11B 20/00086* (2013.01); *G11B 20/0021* (2013.01); *G11B 20/00115* (2013.01); *G11B 20/00123* (2013.01); *G11B 20/00173* (2013.01); *G11B 20/00579* (2013.01); *G06Q 30/018* (2013.01); *G11B 2220/2537* (2013.01)

(58) Field of Classification Search
CPC .................. G06Q 30/018; G11B 20/00086
USPC ................. 705/50–59; 726/26–30; 369/53.21
See application file for complete search history.

(56) References Cited

U.S. PATENT DOCUMENTS

| | | | |
|---|---|---|---|
| 4,849,836 A | 7/1989 | Kachikian | |
| 5,295,187 A | 3/1994 | Miyoshi | |
| 5,572,589 A | 11/1996 | Waters et al. | |
| 5,778,230 A | 7/1998 | Wimble et al. | |
| 5,812,850 A | 9/1998 | Wimble | |
| 5,822,435 A | 10/1998 | Boebert et al. | |

(Continued)

FOREIGN PATENT DOCUMENTS

| | | |
|---|---|---|
| CA | 2434538 | 10/2002 |
| GB | 2178574 A | 2/1987 |

(Continued)

OTHER PUBLICATIONS

DVD Technology Training, part 1, DVD Format & Process Training, Vencil Wells, AudioDev AB, Malmo, Sweden, pp. 1-31, date unknown.

(Continued)

*Primary Examiner* — James D Nigh
(74) *Attorney, Agent, or Firm* — Sandy Swain; Judy Yee; Micky Minhas

(57) ABSTRACT

Functionality is described for reducing the unauthorized reproduction of optical media, such as optical discs of various types. The functionality operates by adding a physical descriptor to an optical medium, forming reference descriptor information based on the descriptor, signing the reference descriptor information to produce authenticity information, and adding the authenticity information to the optical medium. At a point of consumption, the functionality operates by reading the authenticity information and reading the descriptor. Based on the information that is read, the functionality performs cryptographic analysis and descriptor-based analysis to validate the optical medium. The functionality includes various provisions to reduce the impact of wear and tear on the above-summarized analysis. The functionality can be applied to stamped or recordable optical media.

20 Claims, 11 Drawing Sheets

(56) References Cited

U.S. PATENT DOCUMENTS

| | | | |
|---|---|---|---|
| 5,984,366 A * | 11/1999 | Priddy | 283/72 |
| 6,070,009 A | 5/2000 | Dean et al. | |
| 6,249,606 B1 | 6/2001 | Kiraly | |
| 6,374,402 B1 | 4/2002 | Schmeidler et al. | |
| 6,397,380 B1 | 5/2002 | Bittner et al. | |
| 6,567,914 B1 | 5/2003 | Just et al. | |
| 6,571,193 B1 | 5/2003 | Unuma | |
| 6,606,412 B1 | 8/2003 | Echigo | |
| 6,668,015 B1 | 12/2003 | Kranawetter et al. | |
| 6,668,325 B1 | 12/2003 | Collberg et al. | |
| 6,747,930 B1 | 6/2004 | Weldon et al. | |
| 6,807,548 B1 | 10/2004 | Kemper | |
| 7,003,131 B2 | 2/2006 | Watson et al. | |
| 7,065,634 B2 | 6/2006 | Lewis et al. | |
| 7,076,660 B2 | 7/2006 | Newman | |
| 7,149,805 B2 | 12/2006 | Bartolome et al. | |
| 7,194,690 B2 | 3/2007 | Guillermo et al. | |
| 7,356,172 B2 | 4/2008 | Fan | |
| 7,376,073 B2 | 5/2008 | Hart, III et al. | |
| 7,451,439 B2 | 11/2008 | Nickell et al. | |
| 7,596,778 B2 | 9/2009 | Kolawa et al. | |
| 7,627,861 B2 | 12/2009 | Smith | |
| 7,681,190 B2 | 3/2010 | Venkatesan et al. | |
| 7,992,001 B2 | 8/2011 | Granados et al. | |
| 8,166,464 B2 | 4/2012 | Lin et al. | |
| 8,239,967 B2 | 8/2012 | McMichael et al. | |
| 2001/0018743 A1 | 8/2001 | Morishita | |
| 2001/0033659 A1 | 10/2001 | Eisenberg | |
| 2002/0026602 A1* | 2/2002 | Edelkind | 714/6 |
| 2002/0059567 A1 | 5/2002 | Minamide et al. | |
| 2002/0059568 A1 | 5/2002 | Kawahito et al. | |
| 2002/0067674 A1 | 6/2002 | Schneck et al. | |
| 2002/0084405 A1 | 7/2002 | Matsumoto et al. | |
| 2002/0104071 A1 | 8/2002 | Charisius | |
| 2002/0111997 A1 | 8/2002 | Herlihy | |
| 2002/0114265 A1 | 8/2002 | Hart, III et al. | |
| 2002/0136121 A1* | 9/2002 | Salmonsen et al. | 369/47.53 |
| 2002/0152436 A1 | 10/2002 | O'Dea | |
| 2002/0166096 A1 | 11/2002 | Shieh | |
| 2002/0188566 A1 | 12/2002 | Inchalik et al. | |
| 2003/0053656 A1 | 3/2003 | Levy | |
| 2003/0154376 A1 | 8/2003 | Hwangbo | |
| 2003/0177472 A1 | 9/2003 | de Jong | |
| 2004/0008864 A1 | 1/2004 | Watson et al. | |
| 2004/0097217 A1 | 5/2004 | McClain | |
| 2004/0103402 A1 | 5/2004 | Bera | |
| 2004/0143742 A1 | 7/2004 | Muratani | |
| 2004/0153941 A1 | 8/2004 | Muratani | |
| 2004/0168025 A1* | 8/2004 | Carson | 711/112 |
| 2004/0253923 A1 | 12/2004 | Braley et al. | |
| 2005/0008812 A1 | 1/2005 | Jackson et al. | |
| 2005/0099612 A1 | 5/2005 | Kirovski | |
| 2005/0108538 A1 | 5/2005 | Howard et al. | |
| 2005/0180637 A1 | 8/2005 | Ikeda | |
| 2005/0210255 A1 | 9/2005 | Kirovski | |
| 2006/0013475 A1 | 1/2006 | Philomin | |
| 2006/0123384 A1 | 6/2006 | Nickell et al. | |
| 2006/0135064 A1 | 6/2006 | Cho et al. | |
| 2006/0136334 A1 | 6/2006 | Atkinson et al. | |
| 2006/0153052 A1 | 7/2006 | Meerwald et al. | |
| 2006/0158976 A1 | 7/2006 | Fukunaga et al. | |
| 2006/0190800 A1* | 8/2006 | Sollish et al. | 714/758 |
| 2006/0206709 A1 | 9/2006 | Labrou et al. | |
| 2006/0241999 A1 | 10/2006 | Tsyganskiy et al. | |
| 2006/0242197 A1 | 10/2006 | Tsyganskiy | |
| 2007/0123166 A1 | 5/2007 | Sheynman et al. | |
| 2007/0226484 A1 | 9/2007 | Pering et al. | |
| 2007/0234058 A1 | 10/2007 | White | |
| 2007/0280095 A1 | 12/2007 | Yoshida et al. | |
| 2007/0285419 A1 | 12/2007 | Givon | |
| 2008/0125678 A1 | 5/2008 | Breen | |
| 2008/0137848 A1 | 6/2008 | Kocher et al. | |
| 2008/0172560 A1* | 7/2008 | Hughes et al. | 713/176 |
| 2008/0172686 A1 | 7/2008 | Selinfreund | |
| 2008/0252463 A1 | 10/2008 | Andrechak et al. | |
| 2008/0263366 A1 | 10/2008 | G | |
| 2008/0273435 A1 | 11/2008 | Kirovski et al. | |
| 2008/0320444 A1 | 12/2008 | Meijer et al. | |
| 2009/0063867 A1 | 3/2009 | Granados et al. | |
| 2009/0063868 A1 | 3/2009 | Granados et al. | |
| 2009/0085864 A1 | 4/2009 | Kutliroff | |
| 2009/0150296 A1 | 6/2009 | Kirovski et al. | |
| 2009/0158044 A1 | 6/2009 | Kirovski | |
| 2009/0183263 A1 | 7/2009 | McMichael et al. | |
| 2009/0196140 A1 | 8/2009 | Yamaoka et al. | |
| 2009/0202071 A1 | 8/2009 | Kato | |
| 2009/0222799 A1 | 9/2009 | Stewart | |
| 2009/0276635 A1* | 11/2009 | Baggen et al. | 713/182 |
| 2009/0276762 A1 | 11/2009 | Ponitsch | |
| 2009/0328002 A1 | 12/2009 | Lin et al. | |
| 2010/0012715 A1 | 1/2010 | Williams et al. | |
| 2010/0077380 A1 | 3/2010 | Baker et al. | |
| 2010/0197390 A1 | 8/2010 | Craig | |
| 2010/0214894 A1 | 8/2010 | Kirovski | |
| 2011/0083118 A1 | 4/2011 | Moore | |
| 2011/0138362 A1 | 6/2011 | Keidar-Barner et al. | |
| 2012/0163723 A1 | 6/2012 | Balan | |
| 2012/0167061 A1 | 6/2012 | Kirovski | |
| 2012/0192209 A1 | 7/2012 | Ray | |
| 2012/0214594 A1 | 8/2012 | Kirovski | |

FOREIGN PATENT DOCUMENTS

| | | |
|---|---|---|
| JP | 2001357533 A | 12/2001 |
| JP | 2003-331528 A | 11/2003 |
| JP | 2005209308 A | 8/2005 |
| JP | 2008-056613 A | 3/2008 |
| JP | 2008-523537 A | 7/2008 |
| TW | I298157 B | 6/2008 |
| WO | 9743853 A1 | 11/1997 |
| WO | 98/08180 A2 | 2/1998 |
| WO | 02082429 A2 | 10/2002 |
| WO | 2004057580 A2 | 7/2004 |
| WO | 2004072782 A2 | 8/2004 |
| WO | 2006/064412 A1 | 6/2006 |
| WO | 2008116162 A1 | 9/2008 |

OTHER PUBLICATIONS

DVD Technology Training, part 2, DVD Parameter Training, Vencil Wells, AudioDev AB, Malmo, Sweden, pp. 1-51, date unknown.

Potlapally, Nachiketh, R., "Optical Fingerprinting to Protect Data: A Proposal," retrieved at <<http://ieeexplore.ieee.org/stamp/stamp.jsp?tp=&arnumber=993767&isnumber=21439>>, Computer, vol. 35, No. 4, Apr. 2002, pp. 23-28.

"Worldwide Video Game Sales Hit $32 Billion in 2008, Top DVD, Blu-Ray for First Time," retrieved at <<http://www.aol.co.nz/games/story/Worldwide-Video-Game-Sales-Hit-US32-Billion-in-'08-Top-DVD-Blu-ray-for-First-Time/1592561/index.html>>, Game Daily, Jan. 6, 2009, 1 page.

"Entertainment Software Association, Industry Facts," retrieved at <<http://www.theesa.com/facts/index.asp>>, The Entertainment Software Association, 2009, 1 page.

Hefflinger, Mark, "Report: DVD Sales Drop 5.5% in 2008," retrieved at <<http://www.dmwmedia.com/news/2009/01/08/report-dvd-sales-drop-5.5%25-2008%3B-blu-ray-threefold>>, Digital MediaWare Daily, Jan. 8, 2009, 4 pages.

Magiera, March, "Worldwide Packaged Media Up 6% in 2008," retrieved at <<http://www.videobusiness.com/article/CA6631456.html>>, Video Business, Jan. 21, 2009, 3 pages.

Friedlander, Joshua P., "RIAA 2008 Year-End Shipment Statistics," retrieved at <<http://76.74.24.142/D5664E44-B9F7-69E0-5ABD-B605F2EB6EF2.pdf>>, Recording Industry Association of America, 2008, 2 pages.

Brodkin, John, "Software Revenue to Rise 8% in 2008, Gartner Predicts," retrieved at <<http://www.networkworld.com/news/2008/021408-gartner-software-revenue-2008.html>>, Network World, Feb. 14, 2008, 3 pages.

"Sixth Annual BSA-IDC Global Software 08 Piracy Study," Business Software Alliance, retrieved at <<http://global.bsa.org/globalpiracy2008/studies/globalpiracy2008.pdf>>, May 2009, 24 pages.

(56) References Cited

OTHER PUBLICATIONS

Kirovski, Darko, "A Point-Set Compression Heuristic for Fiber-Based Certificates of Authenticity," retrieved at <<http://research.microsoft.com/en-us/um/people/darkok/papers/coadcc.pdf>>, Proceedings of the Data Compression Conference, 2005, 10 pages.

Jablon, David, "IEEE 1363-2000: Standard Specifications for Public Key Cryptography," retrieved at <<http://csrc.nist.gov/groups/ST/toolkit/documents/kms/p1363%20(b-w).pdf>>, NIST Key Management Workshop, Nov. 1-2, 2001, 26 pages.

"Postscribed ID™," retrieved at <<http://www.sonydadc.com/opencms/opencms/sites/am/Digital_Services/PID.html>>, Sony DADC, Sony Corporation, Tokyo, Japan, retrieved on Dec. 10, 2009, 1 page.

Kirovski, Darko, "Optical DNA V2.0," retrieved at <<http://temple.birs.ca/~09w5056/Optical%20DNA%20-%20BIRS%202009%20-%20upload.pdf>>, retrieved on Jan. 25, 2010, 15 pages.

Slattery, et al., "Stability Comparison of Recordable Optical Discs—A Study of Error Rates in Harsh Conditions," retrieved at <<http://nvl.nist.gov/pub/nistpubs/jres/109/5/j95sla.pdf>>, vol. 109, No. 5, 2004, pp. 517-524.

Dejean, et al., "RF-DNA: Radio-Frequency Certificates of Authenticity," retrieved at <<http://research.microsoft.com/en-us/um/people/darkok/papers/ches.rfcoa.pdf>>, Cryptographic Hardware and Embedded Systems, 2007, 14 pages.

International Search Report for Application No. PCT/US2010/040853 (corresponding to U.S. Appl. No. 12/497,571), mailed on Feb. 1, 2011, 9 pages.

International Search Report for Application No. PCT/US2008/057842 (corresponding to U.S. Appl. No. 11/689,741), mailed on Sep. 22, 2009, 5 pages.

Anand, et al., "A Flexible Security Model for Using Internet Content," Proceedings of the 16th Symposium on Reliable Distributed Systems, 1997, pp. 89-96.

Kaliski, Burt, "IEEE P1363: Standard Specifications for Public-Key Cryptography," retrieved at <<http://grouper.ieee.org/groups/1363/P1363/presentation/P1363-Presentation-8-17-99.pdf>>, Aug. 17, 1999, 45 pages.

"Standard ECMA-267, 120 mm DVD—Read-Only Disk," retrieved at <<http://www.ecma-international.org/publications/files/ECMA-ST/Ecma-267.pdf>>, 3rd Edition, Apr. 2001, 96 pages.

"Postscribed ID™ Technical Factsheet," retrieved at <<http://www.n-cd.com/ncdfiles/factsheet_PIDSpecs_2009_03_18.pdf>>, Sony Corporation, Tokyo, Japan, Mar. 2009, 4 pages.

Vijaywargi, et al., "Optical DNA," retrieved at <<http://fc09.ifca.ai/papers/95_optical_dna.pdf>>, Financial Crypto, 2009, 8 pages.

"IEEE P1363a / D4 (Draft Version 4), Standard Specifications for Public Key Cryptography: Additional Techniques," IEEE, Piscataway, NJ, 2000, 78 pages.

Jonker, et al., "Digital Rights Management in Consumer Electronics Products," IEEE Signal Processing Magazine, vol. 21, Issue 2, Mar. 2004, accessible at <<http://ieeexplore.ieee.org/stamp/stamp.jsp?tp=&arnumber=1276116&isnumber=28554>>, pp. 82-91.

Finn, David, "How Technology Can Help in Fighting Counterfeiting and Piracy," Third Global Congress on Combating Counterfeiting and Piracy, Geneva, Jan. 2007, available at <<http://www.ccapcongress.net/archives/Geneva/Files/Finn.pdf>>, 10 pages.

Tuyls, et al., "RFID-Tags for Anti-Counterfeiting," The Cryptographer's Track at the RSA Conference 2006, San Jose, CA, 2006, available at <<http://citeseerx.ist.psu.edu/viewdoc/download-?doi=10.1.1.83.1586&rep=rep1&type=pdf>>, 17 pages.

Hou, et al.; "Three control flow obfuscation methods for Java software"; IEEE Proc.—Softw.; vol. 153, No. 2; Apr. 2006; pp. 80-86.

"Microsoft Financial Data At"; http://finance.yahoo.com; retrieved Dec. 10, 2009; 2 pages.

"Standard ECMA-335 Common Language Infrastructure (CLI) Partitions I to IV"; Dec. 2001; 440 pages.

"Standard ECMA-359 80 mm (1,46 Gbytes per side) and 120 mm (4,70 Gbytes per side) DVD Recordable Disk (DVD-R)"; 1st Edition; Dec. 2004; 149 pages.

Tsai, et al.; "A Graph Approach to Quantitative Analysis of Control-Flow Obfuscating Transformations"; IEEE Transactions on Information Forensics and Security; vol. 4, No. 2; Jun. 2009; pp. 257-267.

Zhang et al.; "Hiding Program Slices for Software Security"; Apr. 2003; 12 pages.

Zhang, et al.; "Software Piracy Prevention: Splitting on Client"; International Conference on Security Technology; 2008; pp. 62-65.

Chinese Patent Application 201080031040.2; First Office Action dated Nov. 5, 2012; 8 pages.

Chinese Patent Application 201080031040.2; Second Office Action dated Jan. 14, 2013; 6 pages.

CN Notice on the Third Office Action for Application No. 201080031040.2, Apr. 24, 2013.

Higo, "Refactoring Support Based on Code Clone Analysis" Lecture Notes in Computer Science, Apr. 5-8, 2004.

Martins, "Refactoring Test Code Safely", International Conference on Software Engineering Advances, Aug. 25-31, 2007.

Sommerlad, "Retaining Comments When Refactoring Code", ACM SIGPLAN International Conference on Object-Oriented Programming, Systems, Languages, and Applications, Oct. 19-23, 2008.

U.S. Appl. No. 11/689,741, filed Mar. 22, 2007.
U.S. Appl. No. 12/389,611, filed Feb. 20, 2009.
U.S. Appl. No. 12/695,152, filed Jan. 27, 2010.
U.S. Appl. No. 12/979,933, filed Dec. 28, 2010.
U.S. Appl. No. 13/030,154, filed Feb. 18, 2011.

Avdeev, "Three-Dimensional Electromagnetic Modelling and Inversion from Theory to Application", Surveys in Geophysics, May 26, 2005.

Barry, "Counterfeits and Counterfeiters: The Ancient World", Publicly Archived on Jan. 4, 2003.

Bellare, "The Exact Security of Digital Signatures—How to Sign with RSA and Rabin", Lecture Notes in Computer Science, 1996.

Born, "Principles of Optics—Electromagnetic Theory of Propagation, Interference and Diffraction of Light", Cambridge University Press, 1999.

"The 2000 CAD Benchmark Unveiled", Microwave Engineering Europe, Oct. 2000.

Sincerbox, "Counterfeit Deterrent Features for the Next-Generation Currency Design", Committee on Next Generation Currency Design, Commission of Engineering and Technical Systems, 1993.

Clemens, "Discrete Electromagnetism with the Finite Integration Technique", Progress in Electromagnetics Research, 2001.

Collins, "RFID Fibers for Secure Application", RFID Journal, Mar. 26, 2004.

Dejean, "Making RFIDs Unique—Radio Frequency Certificates of Authenticity", IEEE Antennas and Propagation Society International Symposium, 2006.

Dey, "Circularly Polarized Meander Patch Antenna Array", IEEE Antennas and Propagation Society International Symposium, 1996.

Garcia, "On the Accuracy of the ADI-FDTD Method", IEEE Antennas and Wireless Propagation Letters, Feb. 18, 2002.

Haber, "Inversion of 3D Electromagnetic Data in Frequency and Time Domain Using an Inexact All-At-Once Approach", Society of Exploration Geophysicists, Sep. 2004.

Johnson, "The Elliptic Curve Digital Signature Algorithm (ECDSA)", Certicom Research, 1998.

Kirovski, "Toward and Automated Verification of Certificates of Authenticity", ACM Electronic Commerce, May 17-20, 2004.

Koblitz, "Elliptic Curve Cryptosystems", Mathematics of Computation, Jan. 1987.

Li, "Development and Analysis of a Folded Shorted-Patch Antenna with Reduced Size", IEEE Transactions on Antennas and Propagation, Feb. 2004.

Menezes, "Handbook of Applied Cryptography", CRC Press, 1996.

Michel, "EEG Source Imaging", International Federation of Clinical Neurophysiology, Jul. 28, 2004.

Namiki, "3D ADI-FDTD Method—Unconditionally Stable Time-Domain Algorithm for Solving Full Vector Maxwell's Equations", IEEE Transactions on Microwave Theory and Techniques, Oct. 2000.

Pappu, "Physical One-Way Functions", Doctoral Dissertation at Massachusetts Institute of Technology, Mar. 2001.

Pappu, "Physical One-Way Functions", Science Magazine, Sep. 20, 2002.

(56) References Cited

OTHER PUBLICATIONS

Rickard, "Asymptotic Convergence in the FDTD and Tlm Methods", International Conference on Antennas, Radar, and Wave Propagation, 2005.
Rivest, "A Method for Obtaining Digital Signatures and Public-Key Cryptosystems", Communications of the ACM, Feb. 1978.
Shelby, "Experimental Verification of a Negative Index of Refraction" Science Magazine, Apr. 6, 2001.
Tsang, "Scattering of Electromagnetic Waves: Theories and Applications", 2000.
Veselago, "The Electrodynamics of Substances with Simultaneously Negative Values of $\epsilon$ and $\mu$" Soviet Physics Uspekhi, Jan. 1968.
Violino, "Firewall Protection for Paper Documents", RFID Journal, Feb. 11, 2004.
Xu, "Scattering by Rough Surface Using a Hybrid Technique Combining the Multilevel UV method with the Sparse Matrix Canonical Grid Method", Radio Science, Aug. 19, 2005.
Yee, "Numerical Solution of Initial Boundary Value Problems Involving Maxwell's Equations in Isotropic Media", IEEE Transactions on Antennas and Propagation, 1966.
PCT International Search Report and Written Opinion for Application No. PCT/US2008/057842, Jun. 27, 2008.
Forbes, "An Efficient Search Algorithm for Motion Data Using Weighted PCA", Proceedings of the ACM SIGGRAPH/Eurographics Symposium on Computer Animation, Jul. 29-31, 2005.
Friedman, "Additive Logistic Regression: A Statistical View of Boosting", The Annals of Statistics, Apr. 2000.
Inoue, "Fuzzy Support Vector Machines for Pattern Classification", Proceedings of the International Joint Conference on Neural Networks, Jul. 15-19, 2001.
Kim, "Motion Control of a Dancing Character With Music", Proceedings of the 6th Annual IEEE/ACIS International Conference on Computer and Information Science, Jul. 11-13, 2007.
Murphy, "Object Detection and Localization Using Local and Global Features", Lecture Notes in Computer Science, Oct. 2006.
PCT International Search Report and Written Opinion for Application No. PCT/US2012/024787, Reference 331393-02, Oct. 10, 2012.
Zhang, "Three-Dimentional Unilateral Method for the Bilateral Measurement of Condylar Movements", Journal of Biomechanics, Aug. 1995.
Japanese Patent Office, JP 2012-519608 filed Jul. 2, 2010, Office Action dated Nov. 26, 2013.
JP 2012-519608 filed Jul. 2, 2010, Response to Japanese Patent Office Action Dated Nov. 26, 2013 Filed Feb. 25, 2014.
People's Republic of China Patent Office, CN 2010800310402, Notice on Grant dated Sep. 4, 2013.
"First Office Action and Search Report" From: Chinese Patent Application No. 201110449093.2, Mailed Date: Apr. 3, 2014.
"Second Office Action" From: Chinese Patent Application No. 201110449093.2, Mailed Date: Oct. 29, 2014.
"Response to First Office Action" From: Chinese Patent Application No. 201110449093.2, Filed Date: Aug. 18, 2014.
"Response to Office Action" From: Chinese Patent Application No. 201080031040.2, Filed: Dec. 4, 2012.
"Response to Office Action" From: Chinese Patent Application No. 201080031040.2, Filed Date: Jan. 18, 2013.
"Response to Office Action" From: Chinese Patent Application No. 201080031040.2, Filed Date: Jun. 25, 2013.
"Response to Office Action" From: European Patent Application No. 10794805.1, Filed Date: Nov. 26, 2014.
"Response to Office Action" From: Japanese Patent Application No. 2012519608, Filed Dec. 5, 2014.
"Requirement for Restriction/Election" From: U.S. Appl. No. 12/497,571, Mailed Date: Jun. 22, 2012.
"Response to Requirement for Restriction/Election" From: U.S. Appl. No. 12/497,571, Filed Date: Sep. 12, 2012.
"Office Action" From: U.S. Appl. No. 12/497,571, Mailed Date: Dec. 21, 2012.
"Response to Office Action" From: U.S. Appl. No. 12/497,571, Filed Apr. 26, 2013.
"Notice of Allowance" From: U.S. Appl. No. 12/497,571, Mailed Date: Jun. 14, 2013.
"Supplemental Amendment" From: U.S. Appl. No. 12/497,571, Filed Oct. 18, 2013.
"Notice of Allowance" From: U.S. Appl. No. 12/497,571, Mailed Date: Dec. 24, 2013.
"Notice of Allowance" From: U.S. Appl. No. 12/497,571, Mailed Date: Jul. 31, 2014.
"Requirement for Restriction/Election" From: U.S. Appl. No. 12/695,152, Mailed Date: Sep. 24, 2012.
"Response to Restriction Requirement" From: U.S. Appl. No. 12/695,152, Filed Date: Oct. 24, 2012.
"Office Action" From: U.S. Appl. No. 12/695,152, Mailed Date: Dec. 26, 2012.
"Response to Office Action" From: U.S. Appl. No. 12/695,152, Filed Date: Apr. 26, 2013.
"Office Action" From: U.S. Appl. No. 12/695,152, Mailed Date: Jul. 30, 2013.
"Response to Office Action" From: U.S. Appl. No. 12/695,152, Filed Date: Nov. 20, 2013.
"Notice of Allowance" From: U.S. Appl. No. 12/979,933, Mailed Date: Dec. 26, 2014.
"Third Office Action Issued for Japan Patent Application No. 2012-519608", Mailed Date: Jan. 6, 2015, 7 Pages.
"Search Report Received in European Patent Application No. 10794805.1", Mailed Date: Jul. 7, 2014, 3 Pages.
"Office Action Received for European Patent Application No. 10794805.1", Mailed Date: Aug. 18, 2014, 7 Pages.
"Office Action Issued in Japan Patent Application No. 2012-519608", Mailed Date: Sep. 2, 2014, 6 Pages.
"Notice of Allowance," Mailed Apr. 28, 2015, From Japanese Patent Application No. 2012-519608, 3 pages.
"Response to Third Office Action Mailed Jan. 6, 2015," Filed Apr. 2, 2015, From Japanese Patent Application No. 2012-519608, 10 pages.
"Request for Examination with Voluntary Amendment," Filed Jan. 16, 2015, from Japanese Patent Application No. 2013-554491, 7 pages.
"Response to Office Action Dated Oct. 23, 2014," Filed Jan. 21, 2015, From Taiwan Patent Application No. 97109705, 7 pages.
"Search Report," Mailed Mar. 28, 2014, From Taiwan Patent Application No. 97109705, 1 page.
"Response to Office Action Mailed Mar. 28, 2014," Filed Jun. 30, 2014, From Taiwan Patent Application No. 97109705, 7 pages.
"Non-Final Office Action," Mailed Aug. 28, 2012, From U.S. Appl. No. 12/389,611, 42 pages.
"Response to Non-Final Office Action Dated Aug. 28, 2012," Filed Nov. 27, 2012, From U.S. Appl. No. 12/389,611, 16 pages.
"Final Office Action," Mailed Feb. 11, 2013, From U.S. Appl. No. 12/389,611, 6 pages.
"Response to Final Office Action Dated Feb. 11, 2013," Filed Jul. 2, 2013, From U.S. Appl. No. 12/389,611, 8 pages.
"Notice of Allowance," Mailed Jul. 18, 2013, From U.S. Appl. No. 12/389,611, 5 pages.
"Notice of Allowance," Mailed Sep. 24, 2013, From U.S. Appl. No. 12/389,611, 8 pages.
"Notice of Allowance," Mailed May 21, 2014, From U.S. Appl. No. 12/389,611, 9 pages.
"Notice of Allowance," Mailed Jul. 14, 2014, From U.S. Appl. No. 12/389,611, 2 pages.
"Voluntary Amendment," Mailed May 26, 2014, From Chinese Patent Application No. 201210037535.7, 9 pages.
Voluntary Amendment and Request for Examination, Filed Jun. 4, 2015 From Republic of Korea Patent Application No. KR 10-2012-7000031. 26 Pages.
Voluntary Amendment and Request for Examination, Filed Jun. 12, 2015, From Canada Patent Application No. CN 2,766,644. 15 Pages.
Notice of Allowanced Mailed Jun. 24, 2015 From Taiwan Patent Application No. 97109705, 4 Pages.

\* cited by examiner

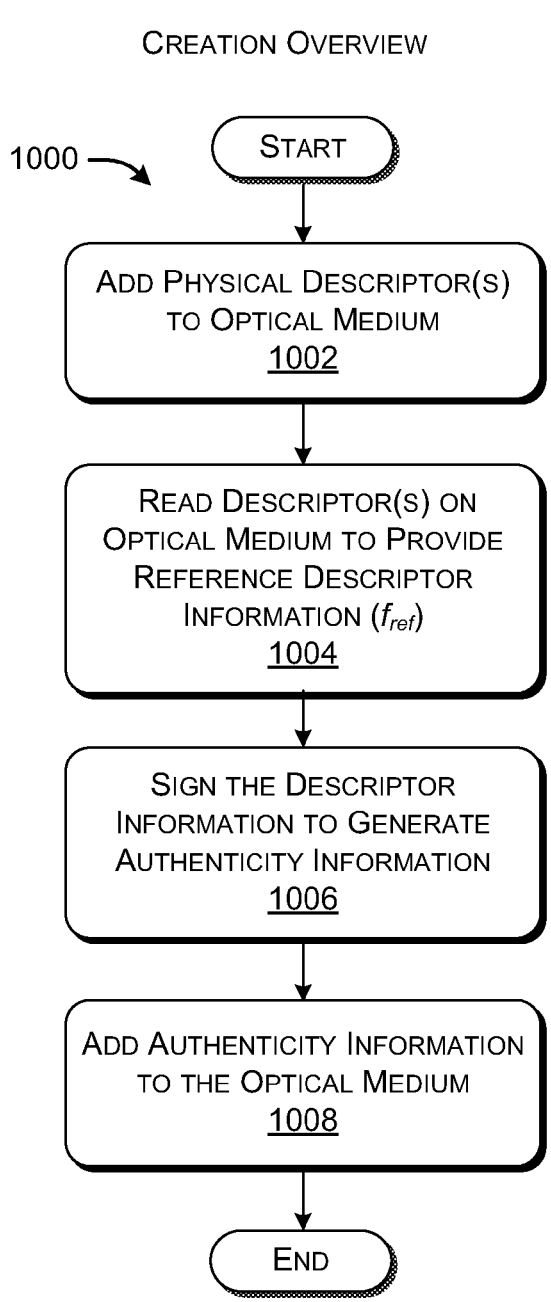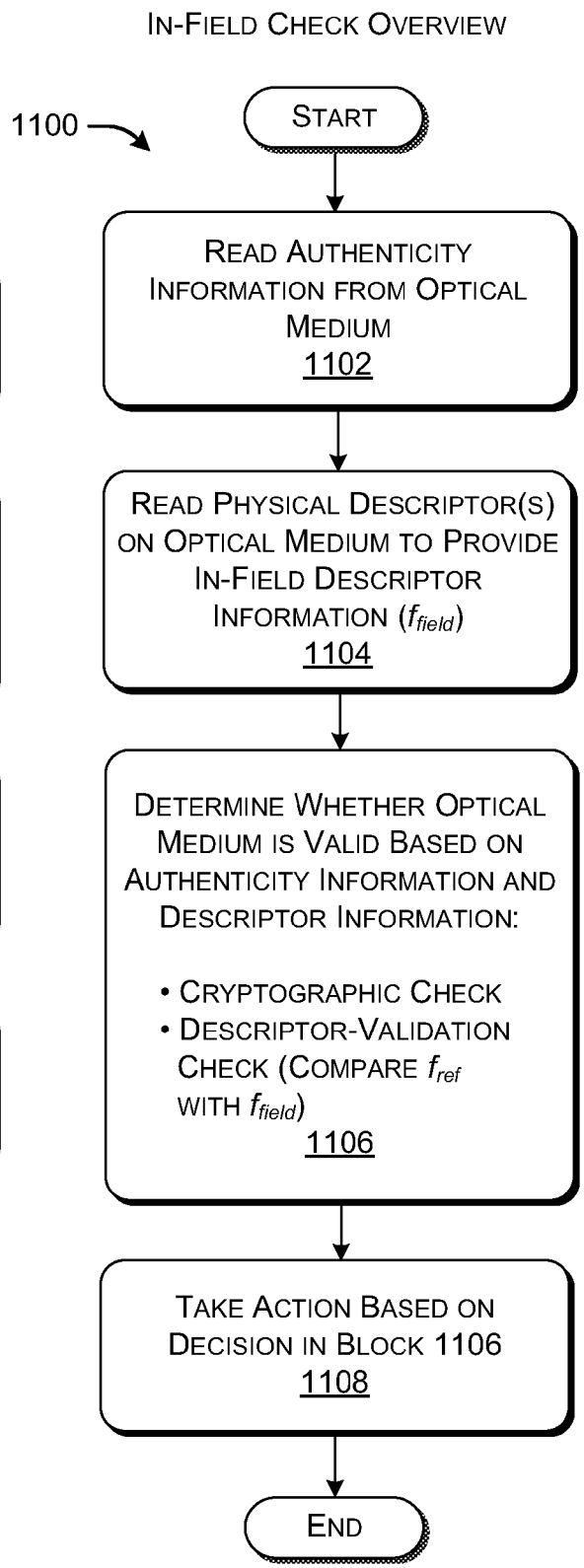
FIG. 10
FIG. 11

OPTICAL MEDIUM WITH ADDED DESCRIPTOR TO REDUCE COUNTERFEITING

BACKGROUND

Manufacturers lose an enormous amount of revenue due to the unauthorized duplication and sale of products. Consumers also suffer from the consequences of such counterfeiting. In some cases, for instance, consumers pay substantially full price for counterfeit products which they believe to be genuine, only to later find out that the products are not authentic. Moreover, the counterfeit products may prove to be substandard or completely inoperative. Many consumers would not purchase such products if they knew, at the outset, that they were not genuine.

Optical discs are often the target of counterfeiting. Optical disks include DVD-type discs, CD-type disks, Blu-Ray discs, and so on. In a typical counterfeiting operation, a counterfeiter obtains an authorized or unauthorized version of digital content, e.g., from an authorized or unauthorized version of a disc which stores that content. The counterfeiter then duplicates the content of that disc on a potentially large number of counterfeit discs. Such content may include movies, software, games, or any other type of digital content.

Understandably, the industry remains highly motivated to reduce the counterfeiting of optical discs and other products. In one approach, a manufacturer of a product can add a unique ID to the product. However, such an approach is not always effective. Despite preventative efforts, a counterfeiter can potentially discover the ID and subsequently duplicate it on the counterfeit products.

In general, known anti-counterfeiting techniques may help reduce the unauthorized duplication of products. But there remain unmet challenges in such efforts, and thus ample room for improvement.

SUMMARY

In one illustrative implementation, a method (and associated functionality) is described for adding authenticity information to an optical medium to reduce counterfeit duplication of the optical medium. The optical medium can correspond, for example, to any type of non-recordable optical disc or any type of recordable optical disc. In one case, the method includes deliberately adding a physical descriptor to the optical medium with the intent of providing at least one data-level region having a length that produces indeterminate interpretations when read plural times. The method then entails reading the descriptor from the optical medium and forming reference descriptor information ($f_{ref}$) based on the descriptor. The method then entails signing the reference descriptor information to provide authenticity information and adding the authenticity information to the optical medium.

At any point of consumption, the method entails reading the authenticity information from the optical medium. As a first check, the method entails gauging the validity of the optical medium based on cryptographic analysis of the authenticity information which contains the cryptographically-signed reference descriptor information ($f_{ref}$). If the optical medium is determined to be cryptographically valid, the method then entails reading the physical descriptor from the optical medium to produce in-field descriptor information ($f_{field}$). This is compared with the reference descriptor information ($f_{ref}$) obtained from the authenticity information.

The descriptor can convey information using multiple descriptor elements. The reference descriptive information ($f_{ref}$) and the in-field reference information ($f_{field}$) can include element type information which conveys whether each element associated with the descriptor is one of a deterministic element or a probabilistic element. The interpretation of a deterministic element is biased towards a single value. The interpretation of a probabilistic element is not biased towards a single value. Probabilistic elements correspond to elements that achieve the intended length described above that produces indeterminacy. Such a length is referred to herein as an indeterminacy-inducing length. The reference descriptor information can also include additional information pertaining to the approximate length of each element, as determined at production time, which can be used to determine the expected distribution of read lengths in the field.

The physical descriptor added to the optical medium acts as a fingerprint for the optical media that is hard for counterfeiters to reproduce. It is particularly difficult for counterfeiters to duplicate the probabilistic elements of the descriptor. This is because these elements produce their indeterminate read-out consequences within a relatively narrow tolerance. With a slight divergence in length of a data-level region, a counterfeiter may produce not a probabilistic element, but a deterministic element.

According to another illustrative aspect, the method may deliberately produce the descriptor within a particular region of the optical medium. In this case, it is possible to read the descriptor relatively quickly by scanning the designated region.

According to another illustrative aspect, the reading and processing of the descriptor information at the point of consumption is resilient to wear and tear on the optical medium. The method can enhance this capability by adding plural descriptors to the optical media. In addition, or alternatively, the method can record plural items of reference descriptor information under different environmental conditions (such as a tilt condition) or aging models. An optical media is deemed valid if the in-field descriptor information matches the reference descriptor information based on a defined matching rule. Through the use of plural descriptors and/or plural items of reference information captured under different conditions, the method can anticipate and possibly counteract the effects of wear and tear on the optical medium.

According to another illustrative aspect, the above-described method can be achieved by modifying existing devices which play optical media. Such modification can be performed in an efficient and economical manner.

Various end-use scenarios are developed based on the above-summarized method. In one approach, the method can be used to reduce the unauthorized duplication of optical media manufactured by a stamping process. In another approach, the method can be used to control the duplication of optical media using a content-burning process. In another approach, the method can be used to provide an optical medium which serves as a certificate of authenticity with respect to a physical article of any type, such as a computer, a piece of clothing, etc. Still other applications of the method are envisioned.

The above approach can be manifested in various types of systems, devices, components, methods, computer readable media (e.g., discs, etc.), data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 10 shows an illustrative process for creating authenticity information using the system of FIG. 1.

FIG. 11 shows an illustrative process for validating an optical medium that includes authenticity information added thereto as per the method of FIG. 10.

FIG. 12 shows an illustrative process that uses the method of FIG. 10 in the mass production of optical media at a manufacturing facility or the like.

FIG. 13 shows an illustrative process that uses the method of FIG. 10 to burn content onto an optical medium at a user site or the like.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth functionality for reducing unauthorized reproduction of products, such as optical discs. Section A describes illustrative systems for achieving this result. Section B describes illustrative methods which explain the operation of the systems of Section A. Section C describes illustrative processing functionality that can be used to implement any aspect of the features described in Sections A and B.

This disclosure is related to commonly assigned U.S. application Ser. No. 11/689,741 ('741), filed on Mar. 22, 2007, entitled "Optical DNA," naming the inventors of Kirovski et al. This disclosure is also related to commonly assigned U.S. application Ser. No. 12/389,611 ('611), filed on Feb. 20, 2009, entitled "Optical DNA Based on Non-Deterministic Errors," naming the inventor of Darko Kirovski. Both of these patent applications ('741 and '611) are incorporated by reference herein in their respective entireties.

Figure 17:
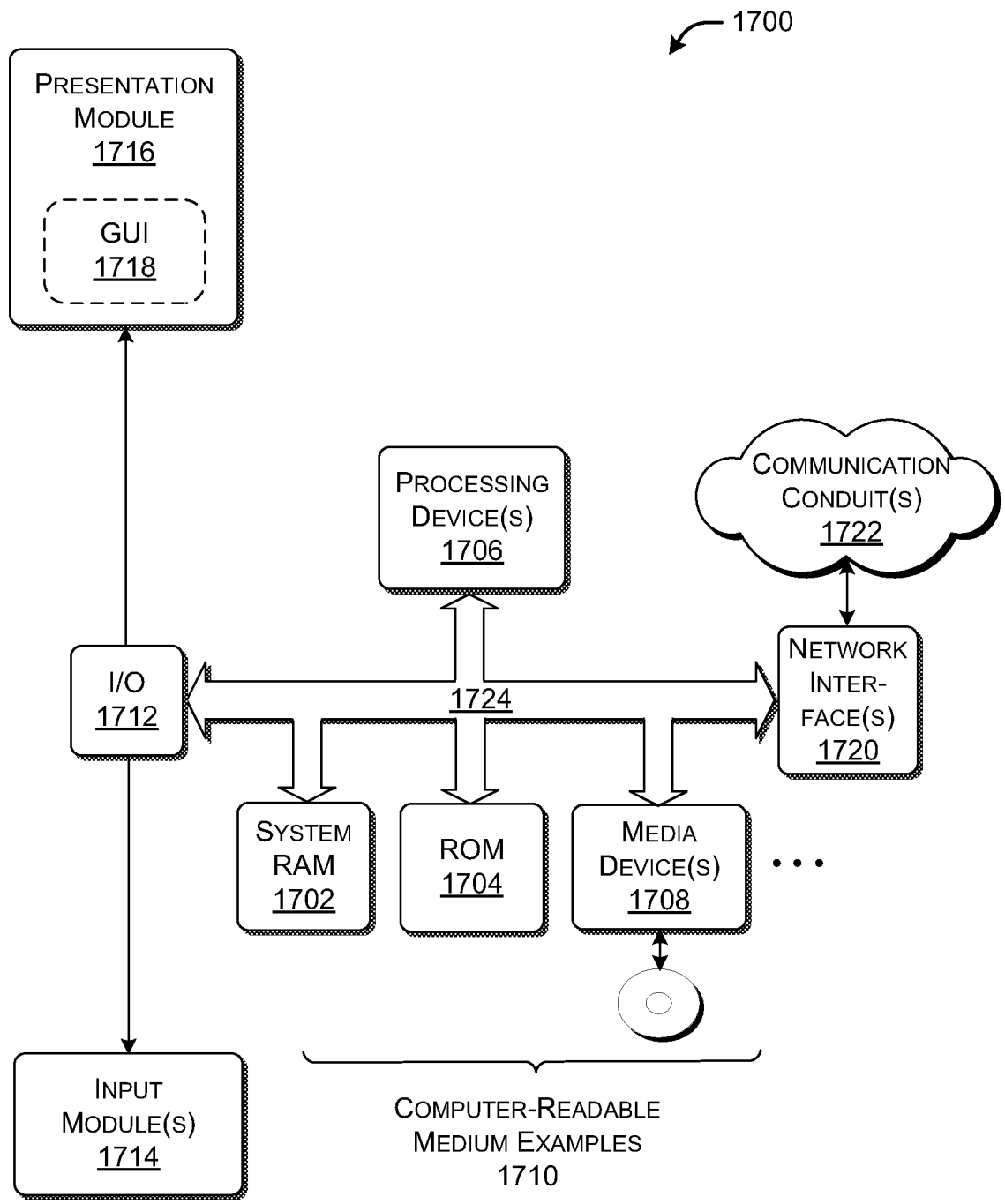
FIG. 17 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner, for example, by software, hardware (e.g., discrete logic components, etc.), firmware, and so on, or any combination of these implementations. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 17, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented by software, hardware (e.g., discrete logic components, etc.), firmware, manual processing, etc., or any combination of these implementations.

As to terminology, the phrase "configured to" encompasses any way that any kind of functionality can be constructed to perform an identified operation. The functionality can be configured to perform an operation using, for instance, software, hardware (e.g., discrete logic components, etc.), firmware etc., and/or any combination thereof.

The term "logic component" encompasses any functionality for performing a task. For instance, each operation illustrated in the flowcharts corresponds to a logic component for performing that operation. An operation can be performed using, for instance, software, hardware (e.g., discrete logic components, etc.), firmware, etc., and/or any combination thereof. When implemented by an electrical apparatus of any type (such as a computer or optical disc player), a logic component represents an electrical component that is a physical part of the electrical apparatus, however implemented.

A. Illustrative Systems

A.1. Overview

Figure 1:
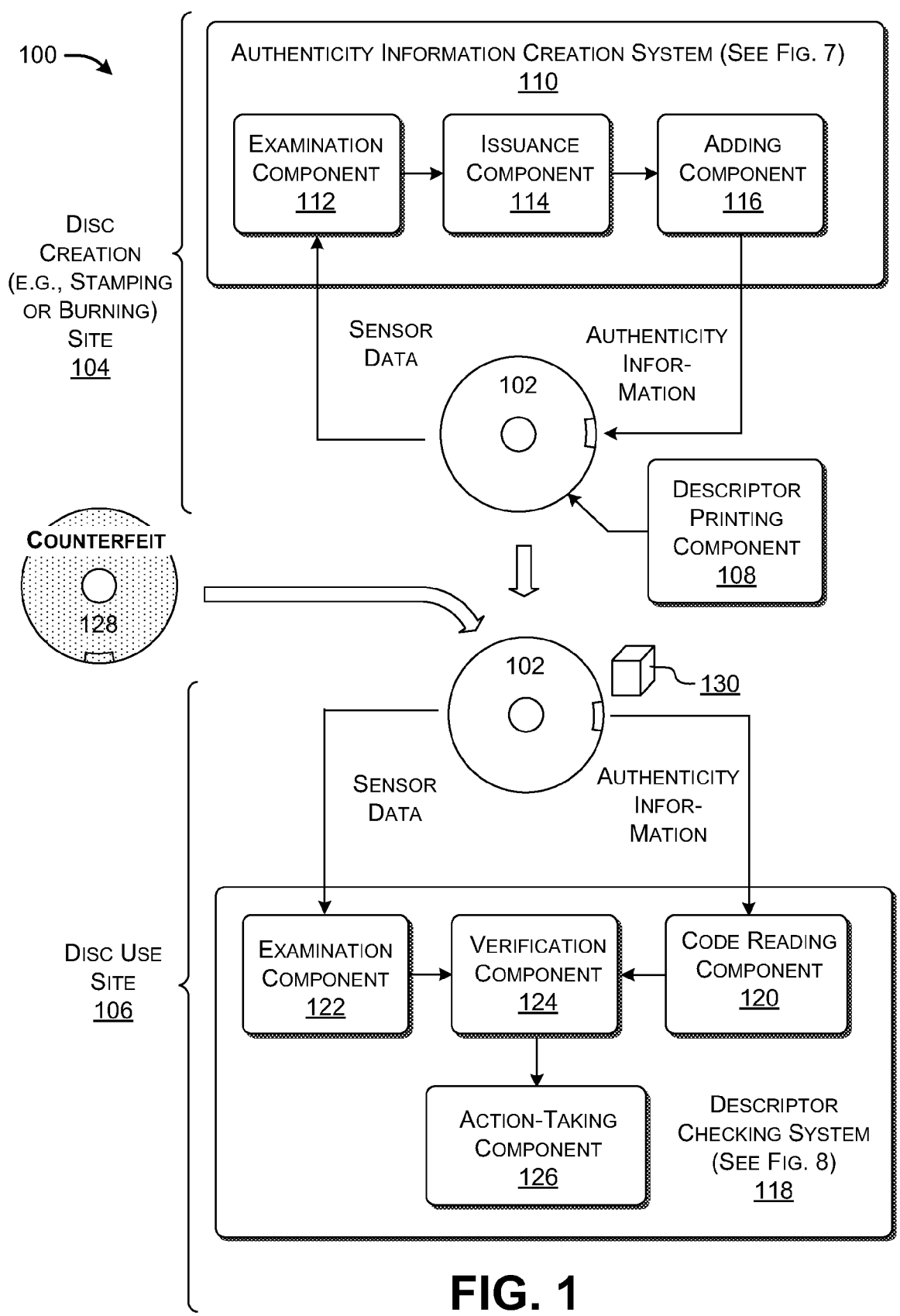
FIG. 1 shows an overview of an illustrative system for reducing the unauthorized duplication of an optical medium.

FIG. 1 shows an illustrative system 100 for reducing the unauthorized duplication of a recording medium. In one case, the recording medium corresponds to an optical recording medium in the form of an optical disc. For example, the optical disc can be produced according to any DVD-related standard, any CD-related standard, the Blu-Ray standard, and so on. In another case, the optical medium can take other forms, such as an optical card, etc. However, to facilitate discussion, the remaining explanation will be framed in the context of anti-counterfeiting measures applied to optical discs. FIG. 1 shows one such illustrative optical disc 102.

The optical disc 102 can store any type of content, such as, but not limited to, video content (e.g., a movie), software content, game-related content, data content (e.g., financial tables, etc.), and so on. Section A.2 below will provide additional explanation of the physical characteristics of the optical disc 102, as these characteristics relate to the anti-counterfeiting provisions employed by the system 100.

The system 100 operates at two sites. A disc creation site 104 is a locale at which an optical disc 102 is created. For instance, in one case, the disc creation site 104 corresponds to a site at which a large number of non-recordable optical discs are produced, e.g., in a conventional stamping process. Alternatively, the disc creation site 104 corresponds to a site at which a user or other entity burns content onto a recordable optical disc. Still other interpretations and implementations of the disc creation site 104 are possible.

A disc use site 106 is any locale at which the optical disc 102 is read or otherwise consumed. For example, the disc use site 106 is the site at which a user loads the optical disc 102 into a player device and attempts to access the content on the optical disc 102, e.g., to watch a movie, play a game, load a software program, etc. Still other interpretations and implementations of the disc use site 106 are possible.

In one case, the disc creation site 104 is different from than the disc use site 106; further, these two sites (104, 106) can use distinct functionality. In another case, the disc creation site 104 can at least partially overlap the disc use site 106; further, these two sites (104, 106) can share at least some functionality. For example, the disc creation site 104 can make use of a device with disc-burning capability. After the content has been added to the disc, the user can access the content using the same device. Thus, such a device implements parts of both the disc creation site 104 and the disc use site 106.

The disc creation site 104 includes a descriptor printing component 108. The descriptor printing component 108 adds one or more physical descriptors to the optical disc 102. At this juncture of the explanation, assume that the descriptor printing component 108 adds a single descriptor to the optical disc 102.

The descriptor corresponds to a physical data-bearing feature of the optical disc 102. In one example, the descriptor uses lands and pits formed on the surface of the optical disc 102 to represent binary data, e.g., 1's and 0's. These lands and pits are generically referred to as data-level regions herein. The next section will explain the physical characteristics of the descriptor in detail. At this point, suffice it to say that the descriptor includes a plurality B of descriptor elements. Together, these descriptor elements can be metaphorically considered as a "fingerprint" of the optical disc.

Like a fingerprint, the descriptor for each optical disc is unique. More specifically, in one implementation, the descriptor printing component 108 operates with the objective of producing descriptor elements having lengths that produce indeterminate interpretations when read plural times, generally referred to as indeterminacy-inducing lengths (to be explained below). Yet due to the difficulty of controlling the printing process on a fine-grained level, the descriptor printing component 108 produces descriptor elements that diverge from the specified length by slight amounts. Each optical disc includes descriptor elements which vary from the specified length in a unique way. This characteristic establishes the uniqueness of the descriptor printed on each optical disc.

In the case in which the optical disc 102 is produced by a stamping process, the descriptor printing component 108 corresponds to whatever manufacturing component stamps the optical disc 102. In other words, the descriptor is just another piece of data stamped onto the optical disc 102 by the stamping process. In the case in which the optical disc 102 is produced by a content-burning process, the descriptor printing component 108 corresponds to whatever player component burns content onto the optical disc. In other words, the descriptor is just another piece of data burned onto the optical disc 102 by the burning process. Still other approaches can be used to create the descriptor on the optical disc 102. To summarize, in one implementation, the descriptor printing component 108 adds the descriptor to the optical disc 102; further, the descriptor printing component 108 attempts to produce descriptor elements having indeterminacy-inducing lengths (to be described below in Section A.2). In many of the examples which follow, the descriptor printing component 108 expressly adds the descriptor to the optical disc 102. However, Section B will close by presenting an alternative implementation in which the descriptor is composed, at least in part, from naturally-occurring errors that appear on the optical disc 102.

The disc creation site 104 also includes an authenticity information creation system 110 (referred to as a "creation system" 110 for brevity below). The creation system 110 includes an examination component 112, an issuance component 114, and an adding component 116. The examination component 112 reads the descriptor that is formed on the optical disc 102 to produce reference descriptor information ($f_{ref}$). The reference descriptor information represents the characteristics of the descriptor in a manner which will be described below. The issuance component 114 can cryptographically sign the reference descriptor information to provide authenticity information. The adding component 116 prints the authenticity information onto the optical disc 102. Hence, considered as whole, the creation system 110 captures the characteristics of the descriptor that is printed on the optical disc 102, and then adds information to the optical disc 102 that represents such characteristics. Section A.3 provides additional explanation of one implementation of the creation system 110.

The disc use site 106 includes a descriptor checking system 118 (referred to below for brevity as a "checking system" 118). The checking system 118 includes a code reading component 120, an examination component 122, a verification component 124, and an action-taking component 126. The code reading component 120 reads the authenticity information from the optical disc 102 that was printed by the adding component 116. Based on this information, the code reading component can obtain the reference descriptor information ($f_{ref}$) that was generated by the creation system 110. The examination component 122 operates in a similar manner to the same-named component of the creation system 110. Namely, the examination component 122 reads the physical descriptor that has been added to the optical disc 102. In this context, the examination component 122 produces in-field descriptor information ($f_{field}$).

The verification component 124 determines whether the optical disc 102 is valid based on two types of tests. First, the verification component 124 performs analysis on the authenticity information to determine whether the optical disc 102 is cryptographically valid (in a manner to be described below). If this test is passed, the verification component 124 performs a descriptor-validation test to determine whether the reference descriptor information ($f_{ref}$) matches the in-field descriptor information ($f_{field}$) within an acceptable tolerance. If these two tests indicate that that the optical disc 102 is valid, then the verification component 124 pronounces the optical disc 102 as valid as a whole. The action-taking component 126 performs any type of action based on the decision made by the verification component 124. For example, the action-taking component 126 can enable or disable access to the content provided by the optical disc 102. The action-taking component 126 can also send notifications to appropriate entities (e.g., a publisher entity) regarding the decision made by the verification component 124, and so on. Section A.4 provides additional explanation of one implementation of the checking system 118.

In the above description, it was assumed that the optical disc 102 processed in the disc creation site 104 is the same optical disc 102 that is processed at the disc use site 106. In this case, the reference descriptor information will presumably match the in-field descriptor information, and the verification component 124 will presumably pronounce the optical disc 102 as valid. But next assume that a counterfeit optical disc 128 is produced in an unauthorized manner. In this process, the counterfeiter may attempt to copy both the content on the optical disc and the accompanying descriptor. For the reasons described in detail below, a counterfeiter will have great difficulty reproducing the descriptor on the counterfeit optical disc 128 with sufficient accuracy such that $f_{ref}$ will match $f_{field}$ (at least in a manner inexpensive enough to justify the counterfeiting effort). As such, for this counterfeit optical disc 128, the reference descriptor information will not match the in-field descriptor information, and the verification component 124 will pronounce this counterfeit optical disc 128 as being invalid. Moreover, the cryptographic protection provided by the system 100 provides another hurdle for a potential counterfeiter to overcome.

The system 100 thereby provides a substantially tamper-proof method for discriminating genuine products from counterfeit products. Armed with such knowledge, merchants and end-users are empowered to identify and reject counterfeit products. Publishers and other entities are also more effectively apprised of the existence of counterfeit products, and may take appropriate action on the basis of this knowledge.

Finally, in the above discussion, the assumption was made that the purpose of the descriptor was to reduce the unauthorized duplication of digital content encoded by the optical disc 102 itself. But the descriptor printed on the optical disc 102 can serve other uses. In another scenario, an entity which sells or otherwise provides an article 130 of any type may provide the descriptor-bearing optical disc 102 to the user. The optical disc 102 in this scenario serves as a certificate of authenticity which vouches for the validity of the article 130. The user can load the optical disc 102 into any player to determine whether the article 130 is valid. For example, the article 130 can correspond to a computer, a piece of clothing, a legal document, and so on.

A.2. Illustrative Descriptor

Having presented an overview of the system 100, the ensuing section describes the physical characteristics of the optical disc 102 and the descriptor. This section will also explain the relevance of the physical characteristics of the descriptor with respect to the operation of the system 100 as a whole. In one example, the optical disc 102 conforms to the DVD standard specified in ECMA-267 ("120 mm DVD—Read-Only Disk," $3^{rd}$ edition, 2001). However, the principles described herein can be implemented using optical media that conform to other standards.

Figure 2:
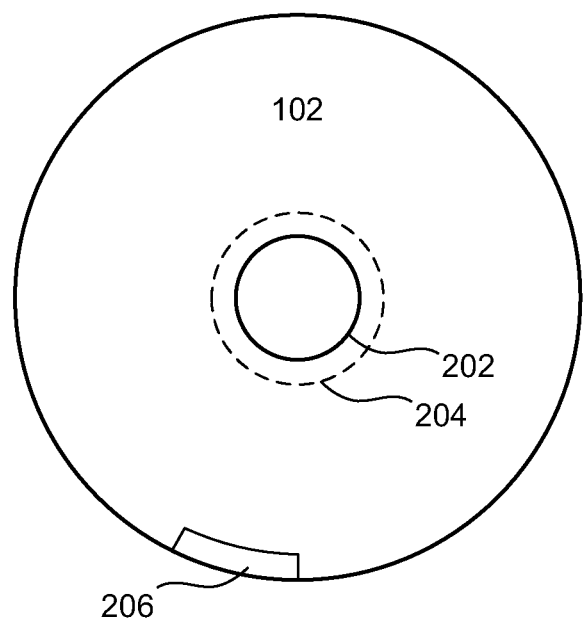
FIG. 2 shows an illustrative optical disc that can be operated on by the system of FIG. 1.

FIG. 2 shows one implementation of the optical disc 102. The optical disc 102 is circular in shape and includes a center hole 202. The optical disc 102 provides a spiral path (not shown) on which digital content can be encoded in a conventional fashion.

In one case, the descriptor printing component 108 (of FIG. 1) can print the descriptor at a predetermined location on the optical disc 102. For example, the descriptor printing component 108 can add the descriptor in a region 204 of the optical disc 102 that has traditionally been used to store the table of contents for the optical disc 102. For example, the descriptor printing component 108 can print the descriptor before or after data associated with the table of contents. In this manner, the descriptor will not interfere with payload data associated with the primary content carried by the optical disc 102. Other implementations can store the descriptor at other locations on the optical disc 102. Further, as will be explained below, the descriptor printing component 108 can print plural descriptors onto the optical disc 102, possibly in different respective regions of the optical disc 102. And finally, Section B presents another implementation in which the descriptor is composed of naturally-occurring errors in the data encoded on the optical disc 102.

The adding component 116 likewise can add the authenticity information to a predetermined region of the optical disc 102. In the case of a content-burning operation, the adding component 116 can add the authenticity information at any prescribed region of the optical disc 102 in the course of burning the content onto the optical disc 102. Again, in this case, the descriptor is treated like any other data that is added to the optical disc 102. In the case of a stamping operation, the adding component 116 can add the authenticity information to a designated region 206 that can accommodate the storage of data after the stamping process. Technology exists in the marketplace for conducting post-stamping storage. One such technology is Postscribed ID™, provided by Sony Corporation of Minato, Tokyo, Japan. In one case, the post-stamping storage is akin to a content-burning operation, but applied to only the designated region 206 of the optical disc 102.

Alternatively, the adding component 116 can use non-optical technology to record the authenticity information onto the optical disc 102. For example, the adding component 116 can store the authenticity information in magnetic form on a suitable magnetic portion of the optical disc 102, and so on. In yet another alternative, the adding component 116 can add the authenticity information (using any type of technology) to a designated region which is separate from the optical disc 102. For example, the adding component 116 can add the authenticity information to the casing or packaging associated with the optical disc 102.

Figure 3:
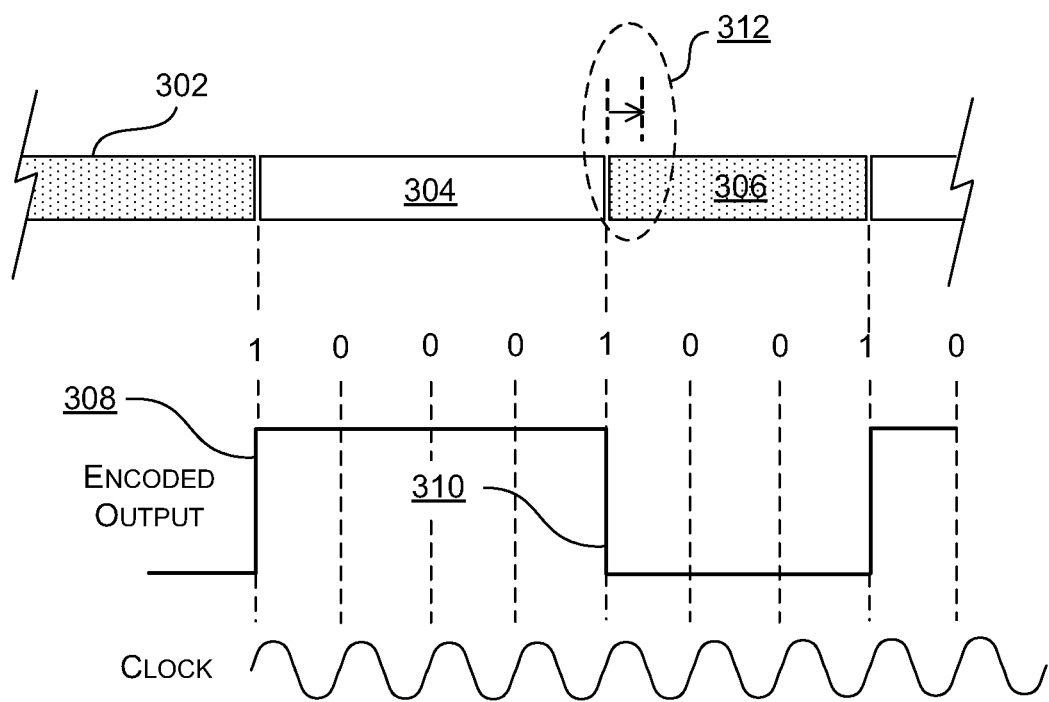
FIG. 3 shows an illustrative encoded output produced by reading data-level regions formed on the surface of an optical disc.

FIG. 3 shows a portion of a descriptor 302 that includes plural descriptor elements. From a high-level perspective, the descriptor 302 includes a sequence of data-level regions having two different data levels, in other words, lands and pits. Data-level region 304 corresponds to a data-level region associated with a first data level, while data-level region 306 corresponds to a data-level region associated with a second data level.

FIG. 3 also shows an encoded output produced when the examination components (112, 122) read the descriptor 302, e.g., by projecting a laser onto the surface of the optical disc 102 and measuring the reflectance of the laser by the surface in conventional fashion. In one implementation, the encoded output conditions a raw sensor signal to conform to the non-return-to-zero-inverted (NRZI) format, as driven by a clock of 26.1 MHz. Here, the encoded output exists in a high state or low state depending on whether the laser is reading from the first data-level region or the second data-level region of the optical disc 102. Further, the examination components (112, 122) produce a 1 when there is a transition between states, either high to low or low to high. The examination components (112, 122) assign 0's to clock cycles between consecutive 1's.

The NRZI encoding is such that the encoded output stays at that the same level for an integer number k of clock cycles between consecutive 1's in the encoded output, e.g., $k \in \mathbb{C}$, $\mathbb{C} = \{3, 4, 5, 6, 7, 8, 9, 10, 11, 14\}$. For example, in FIG. 3, there are four clock cycles between state transition 308 and state transition 310. As a consequence, the standard expects that the physical data-level regions have complementary physical lengths to produce the desired encoded output. To facilitate discussion, the physical lengths of a data-level region will be, in some instances, described in relational terms by reference to a number of clock cycles that are associated with the interpretation of the length. For example, in FIG. 3, the data-level region 304 can be generally said to have a length of four clock cycles because it has produced an interpretation that spans four clock signals. Different players can interpret data-level regions in different ways. Thus, a data-level region that is assessed as a 4 cycle data-level region using one player can conceivably be interpreted as a 5 cycle data-level region by another.

Due to manufacturing inefficiencies, the distance between two signal floor changes is not an exact multiple of the master clock cycle. Rather, the length is a random scalar variable $t_i$ that can be modeled as:

$$t_i = k_i + \mathcal{N}(0, \sigma_M), k_i \in \mathbb{C},\quad (1)$$

In this expression, $k_i$ refers to a number of clock cycles, selected from the permissible set of cycles $\mathbb{C}$.. $m_i = \mathcal{N}(0, \sigma_M)$ denotes the manufacturing noise involved in the production of the optical disc 102. The manufacturing noise can be modeled as a random i.i.d. zero-mean Gaussian variable with a standard deviation $\sigma_M$. A high-quality manufacturing process with low noise is expected to have low $\sigma_M$.

Figure 4:
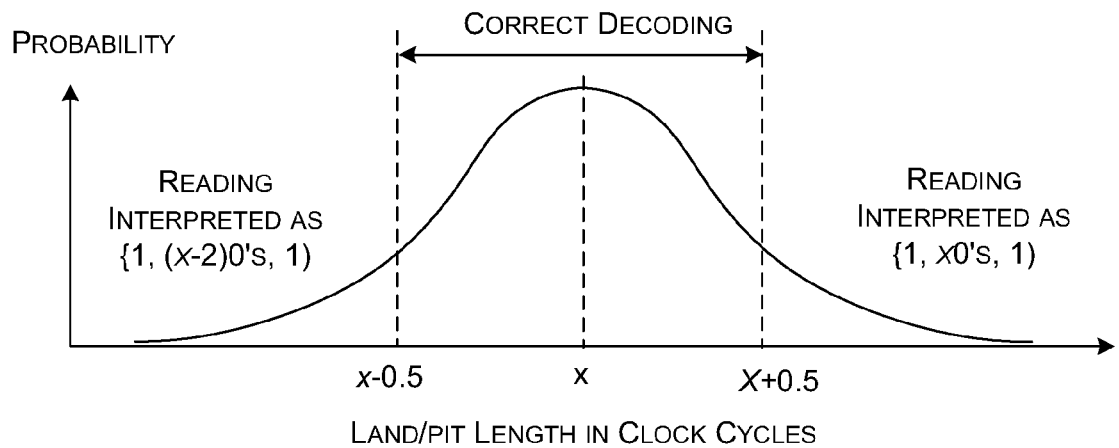
FIG. 4 is a graph which shows a probabilistic distribution of lengths of data-level regions, as result of vagaries in the manufacturing process.

FIG. 4 illustrates a probability density function of the length of a data-level region after manufacturing, for a desired length of $x \in \mathbb{C}$ clock cycles. The expected error rate, $p_e$, is related to $\sigma_M$ as follows:

$$p_e = \frac{1}{2}\mathrm{erfc}\left(\frac{\delta}{\sigma_M \sqrt{2}}\right). \quad (2)$$

The symbol $\delta$ refers to the normalized distance from the mean used as a threshold to define an error; in the present example, $\delta$ equals one half of a cycle. For data-level regions x-cycles long, the examination components (112, 122) are expected to produce (x−1) 0's between two 1's (e.g., as shown in FIG. 3). An error occurs if the reading operation results in any other sequence, with the two most common results being (x−2) 0's and x 0's. Here, the assumption is made that the probability distribution function of the data-level region lengths after manufacturing obeys the Gaussian distribution.

The actual error rate depends upon other factors besides manufacturing noise. Namely, the actual error rate depends upon variances in reader implementation, the alignment of the optical disc 102 in its placeholder, environmental factors such as temperature and humidity, disc aging (encompassing any type of damage to the optical disc), etc. These factors may occur with different magnitudes during the lifetime of the optical disc 102.

The additional noise affecting measurements can be modeled in two parts. A first part encompasses permanent changes to the disc due to aging, which may cause damage to the encoded data. The first part also encompasses noise that is constant when a specific reader is used to read an inserted optical disc. The first part can be modeled using a Gaussian, $c_i = \mathcal{N}(0, \sigma_C)$. This noise, loosely referred to as aging noise, is constant for all in-field measurements of interest.

The second part encompasses per-read variance of measurements. This part can also be modeled as a Gaussian, $v_i = \mathcal{N}(0, \sigma_V)$, referred to as measurement noise. This part is variable and i.i.d. with respect to every distinct in-field measurement of interest. Variances $\sigma_C^2$ and $\sigma_V^2$ statistically set the upper bound on the aging and measurement noise, respectively.

Taken together, the final model for $t_i$ is given by:

$$t_i = k_i + \mathcal{N}(0, \sigma_M) + \mathcal{N}(0, \sigma_C) + \mathcal{N}(0, \sigma_V), k_i \in \mathbb{C}, \quad (3).$$

The actual error rate $p_a$ can be specified as:

$$p_a = \frac{1}{2}\mathrm{erfc}\left(\frac{\delta}{\sqrt{2(\sigma_M^2 + \sigma_C^2 + \sigma_V^2)}}\right). \quad (4)$$

To summarize, the variable $m_i$ refers to manufacturing noise, the variable $c_i$ refers to aging noise, and the variable $v_i$ refers to measurement noise.

Manufacturing Noise. The manufacturing noise, $m_i$, is set once the optical disc 102 is produced and stays constant throughout its lifetime.

Aging Noise. In a worst-case analysis, it can be assumed that the aging noise, $c_i$, will manifest itself at its peak supported statistic $\sigma_C$ once the optical disc 102 is on the market. In other words, the assumption is that the aging noise, once set, stays constant throughout the lifetime of the optical disc 102. Practically, the aging noise $c_i$ does increase over time; however, this noise can be modeled based on the worst-case upper bound of $\sigma_C$. As noted above, from the perspective of an in-field test of interest, the reader-constant noise can be combined with the aging noise and modeled as the single variable, $c_i$. Thus, this noise is reader-specific.

Measurement Noise.

The measurement noise, $v_i$, is introduced ex novo and independently for each in-field measurement of interest. This noise is unique to an individual in-field measurement of interest. As such, it is not dependent upon the lengths of the data-level region.

Before describing the particular characteristics of the descriptor per se in the context of the system 100, consider a normal reading operation in which content is read from the optical disc 102. In such an operation, errors may occur due to the type of noise contributions described above. In the model described above, an error occurs per single read-out if $t_i > k_i + 0.5$ or $t_i \leq k_i - 0.5$. More specifically, consider the hypothetical case in which the examination components (112, 122) are capable of reading an individual data-level region and interpreting the sensor signal produced by that data-level region. As explained above, the encoded output includes a 1, followed by (k−1) 0's, finished by another 1, corresponding to a data-level region k cycles long. In this context, the examination components (112, 122) establish whether the interpreted data is correct (k cycles) or not correct (k−1 cycles or k+1 cycles).

As noted above, one or more components of $t_i$ can be attributed to noise that is independent of the length of the data-level regions. To isolate this type of noise, the examination components (112, 122) can be configured to read the descriptor a plurality L of times. This allows the examination components (112, 122) to identify and statistically attenuate the effects of the measurement noise $v_i$. (At this juncture, it can be assumed that the aging noise $c_i$ is not significant and/or it can be readily taken into account in the manner described below.)

For example, assume that a data-level region produces exactly $t_i=5.5$ cycles long. In this case, the examination components (112, 122) are expected to correctly read the data for about half of the cases. That is, in half of the cases, the examination components (112, 122) may read the data-level region as having a length of 5.0 cycles, and in the other half of the cases, the examination components (112, 122) may read the data-level region as having a length of 6.0 cycles. (In an actual case, the examination components (112, 122) can also possibly read the data-level region as having, on occasion, other lengths, e.g., 4 or 7, etc.; these incidents, however, are not common and can be effectively ignored.) On the contrary, assume that the data-level region is actually $t_i=5.0$ cycles long. Here, the examination components (112, 122) can be expected to predominantly read the data-level region as having a length of 5 cycles. These are examples which demonstrate how the repeated reading of data-level regions can shed light on the actual lengths of the data-level regions.

More formally stated, for a specific $\delta_i=t_i-k_i$, the probability $p_a(\delta_i)$ of an actual read-out error can be computed using Equation (4). Namely, the probability that, in L trials, the examination components (112, 122) detect M errors, obeys a Poisson distribution:

$$Pr[n_e = M \mid L] = \frac{\zeta^M e^{-\zeta}}{M!}. \qquad (5)$$

Here, $\zeta=Lp_a$. The model represented by Equations (4) and (5) establishes a connection between the observed number of errors M and the value of $\delta_i$ as perceived by the examination components (112, 122).

With the above introductory analysis, the manner of operation of the descriptor printing component 108 can be described in greater detail. In a traditional context, the working assumption is that length deviations that destabilize the output are an undesirable phenomena. In contrast, in one implementation, the descriptor printing component 108 deliberately prints a descriptor with deviant lengths to induce indeterminacy in the encoded output. These lengths are referred to below in shorthand as indeterminacy-inducing lengths. The actual length values associated with these lengths may vary among different player devices.

For example, returning to FIG. 3, consider the data-level region 304 demarcated by state transition 308 and state transition 310. This data-level region 304 corresponds to a descriptor element or is at least part of a descriptor element. In a traditional case, it would be typically desirable to produce the data-level region 304 such that a sensor signal produced thereby spans four clock cycles. In the present case, the intent is to produce the data-level region 304 having a length that induces indeterminacy in the encoded output. FIG. 3 graphically illustrates this concept using an arrow 312 which extends from the data-level region 304. The data-level region 304 can be generally said to have a length of 4.5 clock cycles, meaning that the output it induces straddles two values. In some cases, the examination components (112, 122) will read a length of 4 clock cycles; in other cases, the examination components (112, 122) will read a length of 5 clock cycles, and so on.

While lengths are produced with the intent of producing indeterminacy, the purposely "incorrect" descriptor elements are as subject to manufacturing errors as any other data-level regions. For example, assume that the descriptor printing component 108 produces a descriptor having B descriptor elements, with the intent that each of the descriptor elements induces indeterminacy between the values of 4 and 5. In actually, some of the B elements will achieve this effect. But some of the B elements may have lengths that predominantly produce an output of 4, and others may have lengths that predominantly produce an output of 5.

Figure 5:
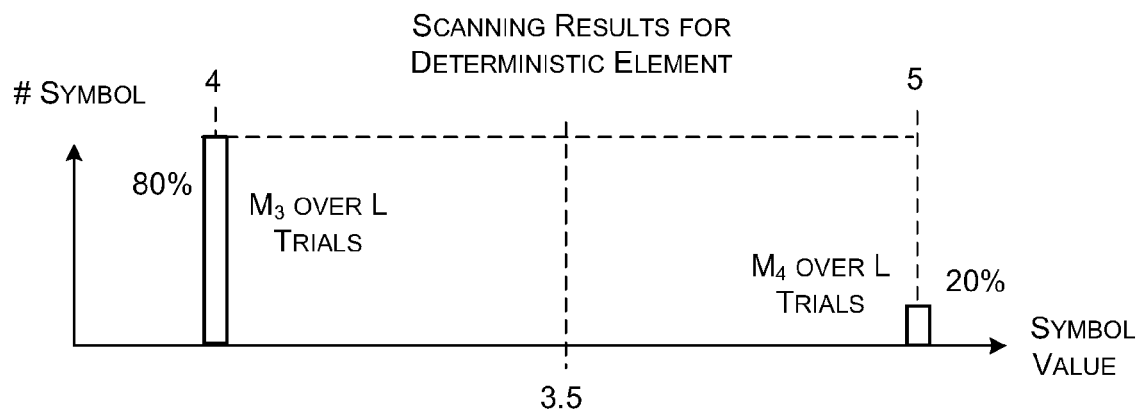
FIG. 5 is a graph which shows an illustrative result of reading a deterministic element L times.
Figure 6:
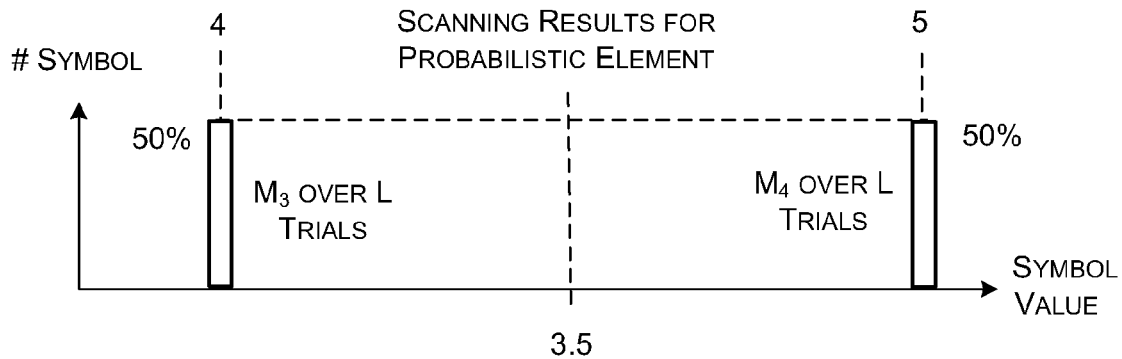
FIG. 6 is a graph which shows an illustrative result of reading a probabilistic element L times.

A descriptor element can be defined as a deterministic element if its interpretation is biased towards a single value. A descriptor element can be defined as a probabilistic element if its interpretation is not biased towards a single value. For example, in the above example, if the examination components (112, 122) predominately read the data-level region 304 as 4 cycles, then this data-level region 304 corresponds to a descriptor element that is deterministic. If, by contrast, the examination components (112, 122) read the data-level region 304 half of the time as 4 cycles and half of the time as 5 cycles, then this data-level region 304 corresponds to a descriptor element that is probabilistic. FIGS. 5 and 6 illustrate the above example in graphical form. Namely, FIG. 5 shows the result of L trials performed on a deterministic element, where 80% of the trials are read as 4 cycles; here, the results are biased towards a single value, namely 4. FIG. 6 shows the results of L trials performed on a probabilistic element, where 50% of the trials are read as 4 cycles and 50% of the trails are read as 5 cycles; here, the results are not biased towards a single value.

More formally stated, a deterministic element is an element which produces a deterministic reading, as defined by $M<\alpha L$ or $M>(1-\alpha)L$, where, again, M refers to a number of readings for a particular value, and L corresponds to the number of trials conducted. A probabilistic element is an element which produces a probabilistic reading, as defined by $\alpha L \leq M \leq (1-\alpha)L$. The parameter $\alpha$ can be selected to classify the descriptor elements with a desired range of selectively.

The examination components (112, 122) leverage the above-described statistical characteristics of the descriptor elements in the following manner. First, the examination components (112, 122) read a descriptor L times. Based on the results of the readings, the examination components (112, 122) classify each element of the descriptor as either a descriptor element or a probabilistic element. The examination components (112, 122) then generate descriptor information which conveys the results of its classification of the descriptor elements.

For example, consider the examination component 112 of the creation system 110, which produces the reference descriptor information $f_{ref}$. The examination component 112 reads each descriptor element L times. For each particular element, the examination component 100 determines whether this element has been consistently interpreted as a single value (in which case it is a deterministic element) or whether this element has consistently yielded inconsistent values (in which case it is a probabilistic element). The examination component 112 can then form the reference descriptor information $f_{ref}$ as a binary-valued vector, where each element of the vector indicates whether a corresponding descriptor element is a deterministic element or a probabilistic element. Alternatively, or in addition, the examination component 112 can form reference descriptive information as a multi-valued vector, where each element of the vector indicates the number of times that a corresponding descriptor element has been interpreted as having a particular value. For example, for a data-level region that is designated to produce indeterminate results between 4 and 5, each element of the multi-valued vector can indicate the number of times that each corresponding descriptor element has been interpreted as 4 cycles. The examination component 122 in the checking system 118 operates in the same manner to produce the in-field descriptor information $f_{field}$.

The reference descriptor information can optionally store additional information pertaining to the descriptor elements. For example, the reference descriptor information can store information regarding the approximate lengths of the data-level regions at production time. This can shed light on the expected distribution of length readings in the field, e.g., during use of the optical disc 102.

The verification component 124 in the checking system 118 can compare the reference descriptor information $f_{ref}$ with the in-field descriptor information $f_{field}$ using any type of distance measurement. For example, the verification component 124 can compute the difference between binary vectors as a Hamming distance. The verification component 124 can compute the difference between vectors with multi-value readings using a Euclidean distance metric. The verification component 124 can also optionally compute a weighted distance measure by weighting the terms in $f_{ref}$ and $f_{field}$ in any manner.

The descriptor is difficult to duplicate in a counterfeiting operation. More specifically, it may be possible for a counterfeiter to successfully reproduce deterministic elements in a descriptor. But it will be much more difficult for the counterfeiter to reproduce indeterminacy-inducing probabilistic elements in an economical manner. This is because probabilistic elements occur within a narrow range of length values, which is difficult to achieve. If the manufacturing process produces a length which varies from the indeterminacy-inducing target by just a small amount, a deterministic element will be produced instead of a probabilistic element (because the interpretations of this element will predominantly favor one value over others). This, in turn, changes the fingerprint associated with the descriptor. More formally stated, because of the tight tolerances in reproducing the indeterminacy-inducing targets, the counterfeiter's manufacturing process has to exhibit a significantly lower variance $\sigma_M^2$ compared to the original manufacturing process. It is envisioned that this goal cannot be achieved in a way that makes counterfeiting an economically feasible enterprise. The original manufacturer does not face these challenges because the reference descriptor information is created after the optical disc is manufactured; so instead of the task of matching or recreating probabilistic elements, the original manufacturer just reads the existing probabilistic elements.

According to another possible advantage, the concentrated printing of indeterminacy-inducing descriptor elements within a designated region (e.g., region 204) of the optical disc 102 may make the authentication technique described above relatively resilient to wear and tear on the optical disc 102, associated with normal aging. This is because, in this implementation, the authentication technique relies on the deliberate printing and reading of elements, rather than the existence of random (non-deliberate) errors dispersed over the entire content-bearing surface of the optical disc 102.

According to another possible advantage, the concentrated printing of the indeterminacy-inducing descriptor elements allows the examination components (112, 122) to read the elements in an efficient amount of time, even in the case in which plural descriptors are printed onto the optical disc 102 (to be described below). This is in contrast to the case in which a descriptor is constructed on the basis of random (non-deliberate) errors that occur anywhere over the content-bearing surface of the optical disc 102.

The above explanation relates to one implementation in which the descriptor is constructed from elements having indeterminacy-inducing lengths, so as to statistically leverage an indeterminate condition associated with a particular standard. Other implementations can exploit other indeterminate conditions associated with other respective standards. In other words, other implementations can identify deterministic and probabilistic elements using other criteria than described above.

A.3. Illustrative Authenticity Information Creation System

Figure 7:
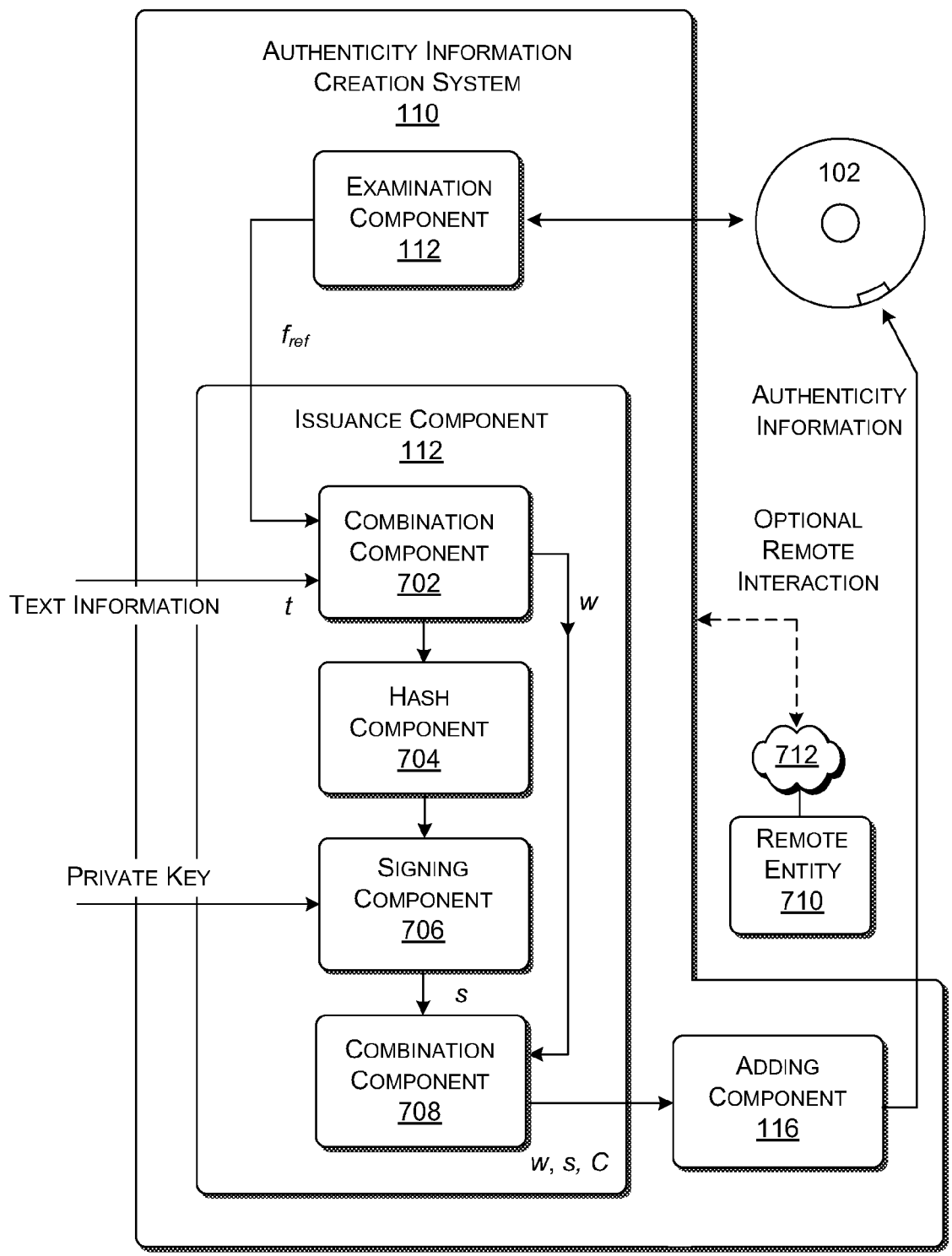
FIG. 7 shows an illustrative authenticity information creation system that can be used in the system of FIG. 1.

FIG. 7 shows additional details regarding the authenticity creation system 110 introduced above. To repeat the introductory explanation provided above, the examination component 112 reads the descriptor that is formed on the optical disc 102 to produce reference descriptor information ($f_{ref}$). The issuance component 114 can cryptographically sign the reference descriptor information to provide authenticity information. The adding component 116 prints the authenticity information onto the optical disc 102.

The issuance component 114 can perform the above-summarized signing operation in different ways. In one approach, a combination component 702 concatenates the reference descriptor information with arbitrary text. The text can provide any information that may have a bearing on the use of the optical disc 102 in a particular end-use scenario. For example, the text can provide an ID associated with the optical disc 102, an expiration date for any license associated with the optical disc 102, a list of permitted options associated with the use of the optical disc 102, a list of jurisdictions in which the optical disc 102 can be used, and so on. In one case, the optical disc 102 can be distributed based on a marketing program that allows the recipient of the optical disc 102 to make one or more copies of the content provided by the optical disc 102. If so, the text can provide information pertaining to the copy-related rights associated with the optical disc 102. In short, no limitation is placed on the information that can be conveyed by the text. The collating operation performed by the combination component 702 produces a concatenated output w.

A hash component 704 optionally hashes the output of the combination component 702 to produce a hashed output. A signing component 706 signs the hashed output to provide a signed output s. In the signing operation, the hashed output can be signed with a private key associated with a publishing entity which provides the content that is encoded on the optical disc 102, or some other appropriate entity. As explained below, the signing component 706 can alternatively be implemented at another location, e.g., to more effectively maintain the secrecy of the private key.

Another combination component 708 concatenates the output w, the output s, and, optionally, a certificate. The certificate can provide a public key associated with the publishing entity and other information regarding the publishing entity. The certificate can be signed by a trusted certificate authority (CA) in a conventional manner. The concatenated output of the combination component 708 collectively constitutes authenticity information. Any component of the authenticity information can be compressed at any stage in its preparation. The adding component 116 prints the authenticity information onto the optical disc 102, e.g., using technology such as Sony's Postscribed ID™ (for stamped non-recordable media), content-burning functionality (for recordable media), or some other approach.

FIG. 7 also indicates that any feature of the creation system 110 can interact with any remote entity 710 via a network 712 for any purpose. In one case, the user may wish to contact the remote entity 710 to purchase the right to make one or more copies of the content provided by the optical disc 102. Any optical disc copied in this manner can be protected using the same descriptor-based approach described above, involving generating reference descriptor information and signing the reference descriptor information. This will provide a way of discriminating legitimate copies from counterfeit copies. Additional information regarding this marketing approach is provided in connection with FIG. 13, to be described below in turn.

In another example, a software vendor or other publishing entity could decide not to disclose its signing key to a disc manufacturer. Instead, the software vendor may opt to provide a signature on demand for each disk produced by the disc manufacturer. In this approach, the disc manufacturer can generate the reference descriptor information in the manner described above and forward it to the software vendor. The software vendor (or any agent acting on its behalf) can sign the reference information and return the signed information to the disc manufacturer. This would enable the software vendor to limit the number of authentic discs that the disc manufacturer could manufacture, e.g., because the disc manufacturer is not in possession of the key and therefore cannot produce the signed information without the assistance of the software vendor.

A.4. Illustrative Descriptor Checking System

Figure 8:
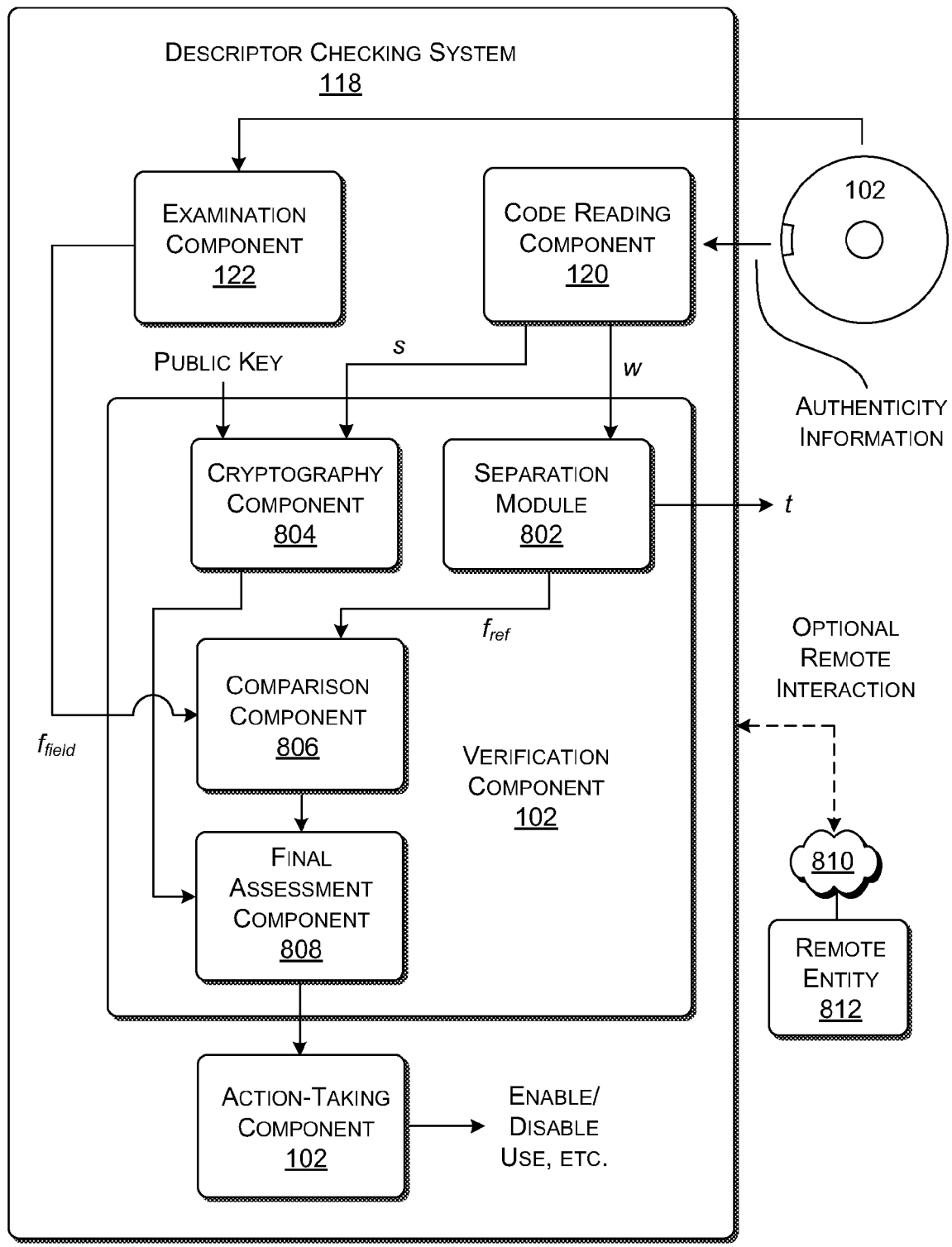
FIG. 8 shows an illustrative descriptor checking system that can be used in the system of FIG. 1.

FIG. 8 shows additional details regarding the descriptor checking system 118 introduced above. To repeat the introductory explanation provided above, the code reading component 120 reads the authenticity information from the optical disc 102 that was printed by the adding component 116. The examination component 122 reads the physical descriptor that has been added to the optical disc 102. In this context, the examination component 122 produces in-field descriptor information ($f_{field}$). The verification component 124 determines whether the optical disc 102 is valid based on a cryptographic test and a descriptor-validation test. The action-taking component 126 performs any type of action based on the decision made by the verification component 124.

As to the verification component 124, a separation component 802 separates different items of information in the authenticity information. One such piece of information includes the reference descriptor information ($f_{ref}$) that was generated by the creation system 110. Another piece of information includes the arbitrary text.

A cryptographic component 804 performs analysis on the authenticity information to determine whether the optical disc 102 is cryptographically valid. This analysis may involve assessing the appropriateness of the certificate provided by the trusted authority, decrypting parts of the authenticity information using the public key of the publishing entity, and so on.

A comparison component 806 performs a descriptor-validation test to determine whether the reference descriptor information ($f_{ref}$) matches the in-field descriptor information ($f_{field}$) within an acceptable tolerance. In one example, the comparison component 806 computes the distance between the vectors represented by $f_{ref}$ and $f_{field}$ using a Hamming distance approach, an Euclidean distance approach, or some other approach. The comparison component 806 then compares the resultant distance with a threshold. The comparison component 806 concludes that the descriptor that has been read is authentic if the distance satisfies the prescribed threshold criterion.

A final assessment component 808 makes a final assessment as to the validity of the optical disc 102. That is, the final assessment component 808 determines that the optical disc 102 is valid if it has passed both the cryptographic test of the cryptographic component 804 and descriptor-validation test of the comparison component 806. If either test fails, the final assessment component 808 pronounces the optical disc 102 as invalid.

FIG. 8 also indicates that any feature of the checking system 118 can interact with any remote functionality via a network 810 for any purpose. For example, in the course of interacting with the content provided on the optical disc 102, the user may opt to purchase additional features from a remote entity 812 (such as a web site associated with the publishing entity). Further, the user can initiate a copy operation in the manner described above with respect to FIG. 7.

In one approach, the checking system 118 of FIG. 8 can be implemented by modifying the control components provided by an existing optical playback device, such as a DVD player, a computer, etc. In this approach, the checking system 118 can redirect certain hardware components already provided by the device to perform new functions. This implementation may be advantageous, as it avoids costly re-engineering of hardware components provided by existing devices. Likewise, in one implementation, the creation system 110 can be implemented by modifying the control components provided by an existing device that burns content onto a recordable optical disc.

A.5. Illustrative Examination Component

Figure 9:
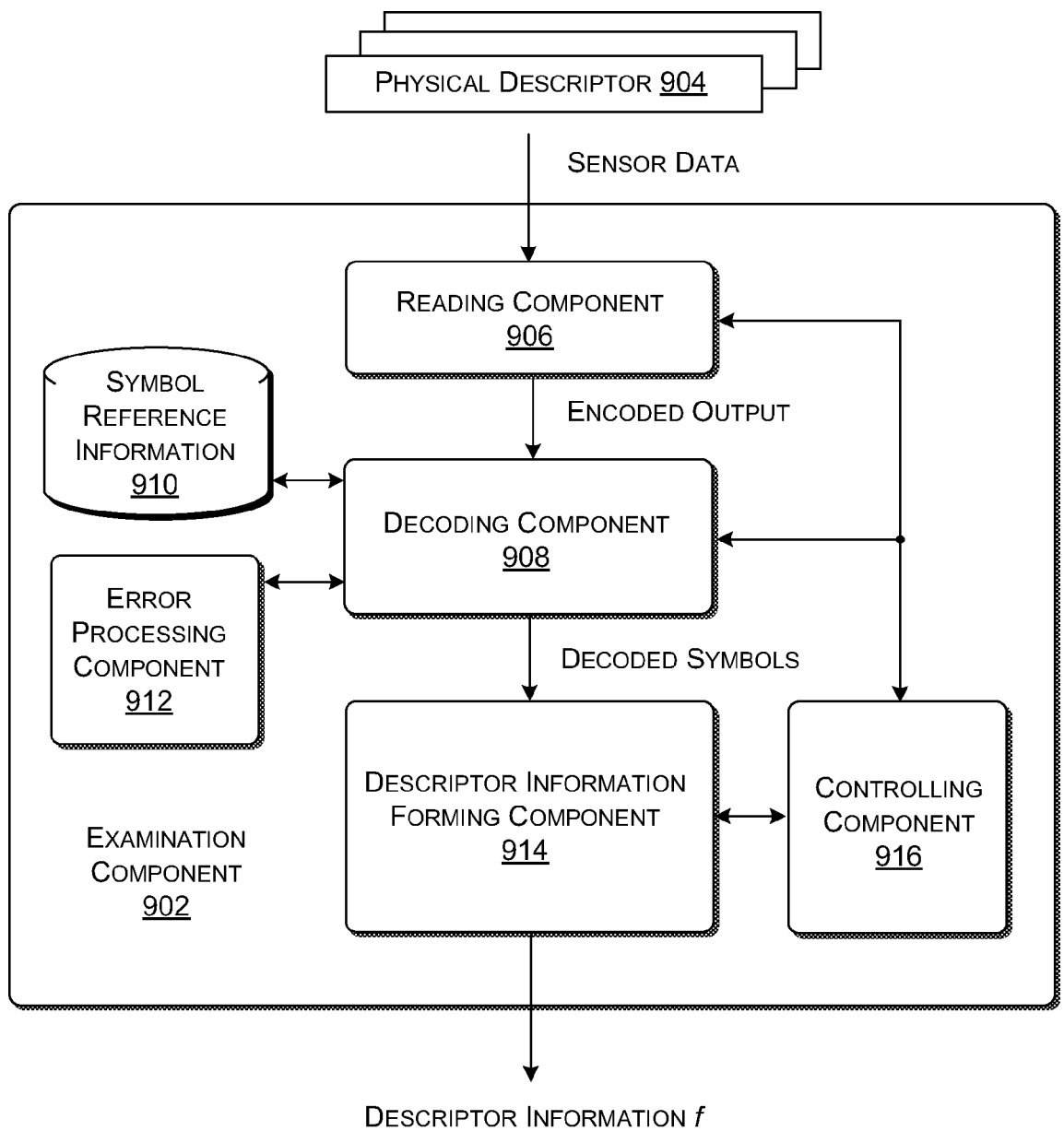
FIG. 9 shows an illustrative examination component that can be used in the authenticity information creation system of FIG. 7 and the descriptor checking system of FIG. 8.

FIG. 9 provides additional details regarding the examination component 112 implemented by the creation system 110 and the examination component 122 implemented by the checking system 118. To facilitate explanation, FIG. 9 re-labels the examination components (112, 122) as examination component 902. The main task of the examination component 902 is to read the physical descriptor 904 on the optical disc 102 and generate descriptor information ($f_{ref}$ or $f_{field}$) based thereon.

The examination component 902 includes a reading component 906 for reading the descriptor. The reading component 906 produces the encoded output shown in FIG. 3, in which data-level regions on the optical disc 102 produce high-level states and low-level states in the encoded output. The reading component 906 can also assign 1's and 0's to the encoded output on the basis of a clock signal in the manner described above. In one particular standard, the reading component 906 outputs 16-bit code words on the basis of its operation.

A decoding component 908 translates the code words provided by the reading component 906 into 8-bit symbols. In one case, the decoding component 908 interprets the code words with reference to a store of symbol reference information 910. The symbol reference information 910 defines a collection of valid symbols. Any encoded output that does not have a counterpart in the symbol reference information 910 can be deemed illegal. An error processing component 912 attempts to correct errors in the data read from the optical disc 102. The error processing component 912 can use any error correction algorithm or combination of error correction algorithms to perform this function.

A descriptor information forming component 914 ("forming component" for brevity) generates the descriptor information, e.g., either $f_{ref}$ or $f_{field}$. The forming component 914 operates on the decoded symbols provided by the decoding component 908, rather than the raw 1's and 0's that are directly associated with the encoded output of the reading component 906. Because of this intermediary relation, the decoding and error correction operations can potentially conceal meaningful low-level features in the output of the reading component 906. The examination component 902 is configured to prevent this from happening.

For example, assume that a data-level region is designed to vacillate between the outputs of 3 and 4. That is, the reading component 906 can be expected to interpret this data-level region as having a length of 3 cycles in some cases, and having a length of 4 cycles in other cases. The examination component 902 is configured such that the decoding component 908 maps these low-level observations to representative symbols. The forming component 914 can be exposed to the meaningful low-level data provided by the reading component 906 via the symbols provided by the decoding component 908. For example, the examination component 902 can be configured such that a reading of 3 cycles translates to a first symbol X and a reading of 4 cycles translates to a second symbol Y. Or the examination component 902 can be configured such that a reading of 3 cycles translates to a legal symbol and a reading of 4 cycles translates to an illegal symbol, and so on.

In one implementation, the examination component 902 can deactivate the error processing component 912. This will prevent the examination component 902 from correcting (and therefore concealing) meaningful low-level observations produced by the reading component 906 (when reading the descriptor). In another implementation, the error processing component 912 is not turned off; rather, the effects of its operation are taken into account in exposing the meaningful low-level observations produced by the reading component 906.

Generally stated, the task of propagating relevant low-level observations to the forming component 914 is a multifactor exercise that depends on the application-specific nature of a particular implementation. This goal can be generally achieved by making appropriate choices with respect to: the printed lengths of the data-level regions; the application-specific operation of the decoding component 908; and the application-specific operation of the error processing component 912, etc.

A controlling component 916 controls the operation of the above-described features of the examination component 902. For example, the controlling component 916 can direct the examination component 902 to read one or more descriptors on the optical disc 102 a plurality of times L. Further, the controlling component 916 can direct the examination component 902 to store the descriptor information that reveals the meaningful low-level observations. Further, the controlling component 916 can direct the examination component 902 to optionally disable the error processing component 912.

B. Illustrative Processes

FIGS. 10-16 show procedures for implementing various aspects of the system 100. These figures also show various applications of the system 100. Since the principles underlying the operation of the system 100 have already been described in Section A, certain operations will be addressed in summary fashion in this section.

Starting with FIG. 10, this figure shows a procedure 1000 by which the creation system 110 can add authenticity information to the optical disc 102.

In block 1002, the descriptor printing component 108 adds one or more descriptors to the optical disc 102, e.g., in a stamping operation, a content-burning operation, etc. While plural descriptors can be added, FIG. 10 will be explained in the context of a single descriptor to facilitate discussion. In this operation, the descriptor component deliberately adds the descriptor to the optical disc 102. But this section closes with an alternative interpretation of FIG. 10, in which the descriptor is constructed from naturally-occurring indeterminacy-inducing data-level regions.

In block 1004, the creation system 110 reads the descriptor from the optical disc 102. The creation system 110 also forms reference descriptor information ($f_{ref}$) in the manner described above.

In block 1006, the creation system 110 signs the reference descriptor information, e.g., with a private key associated with a publishing entity or other appropriate entity. Or the reference descriptor information can be signed on behalf of the creation system 110 by another entity. This produces authenticity information.

In block 1008, the creation system 110 adds the authenticity information to the optical disc 102.

FIG. 11 shows a procedure 1100 by which the checking system 118 can retrieve and analyze authenticity information from the optical disc 102.

In block 1102, the checking system 118 reads the authenticity information from the optical disc 102.

In block 1104, the checking system 118 reads the physical descriptor from the optical disc and forms the in-field descriptor information ($f_{field}$).

In block 1106, the checking system 118 determines whether the optical disc 102 is valid based on a cryptographic test and a descriptor-validation test (in which $f_{ref}$ is compared with $f_{field}$). In one implementation, the checking system 118 performs the cryptographic test first; the checking system 118 only performs block 1104 and advances to the descriptor-validation test if the cryptographic test passes.

In block 1108, the checking system 118 takes action based on the conclusion reached in block 1106. For example, the checking system 118 can permit or deny access to content carried by the optical disc 102. The checking system 118 can also report suspected instances of counterfeiting to appropriate entities.

Figures 12, 13:
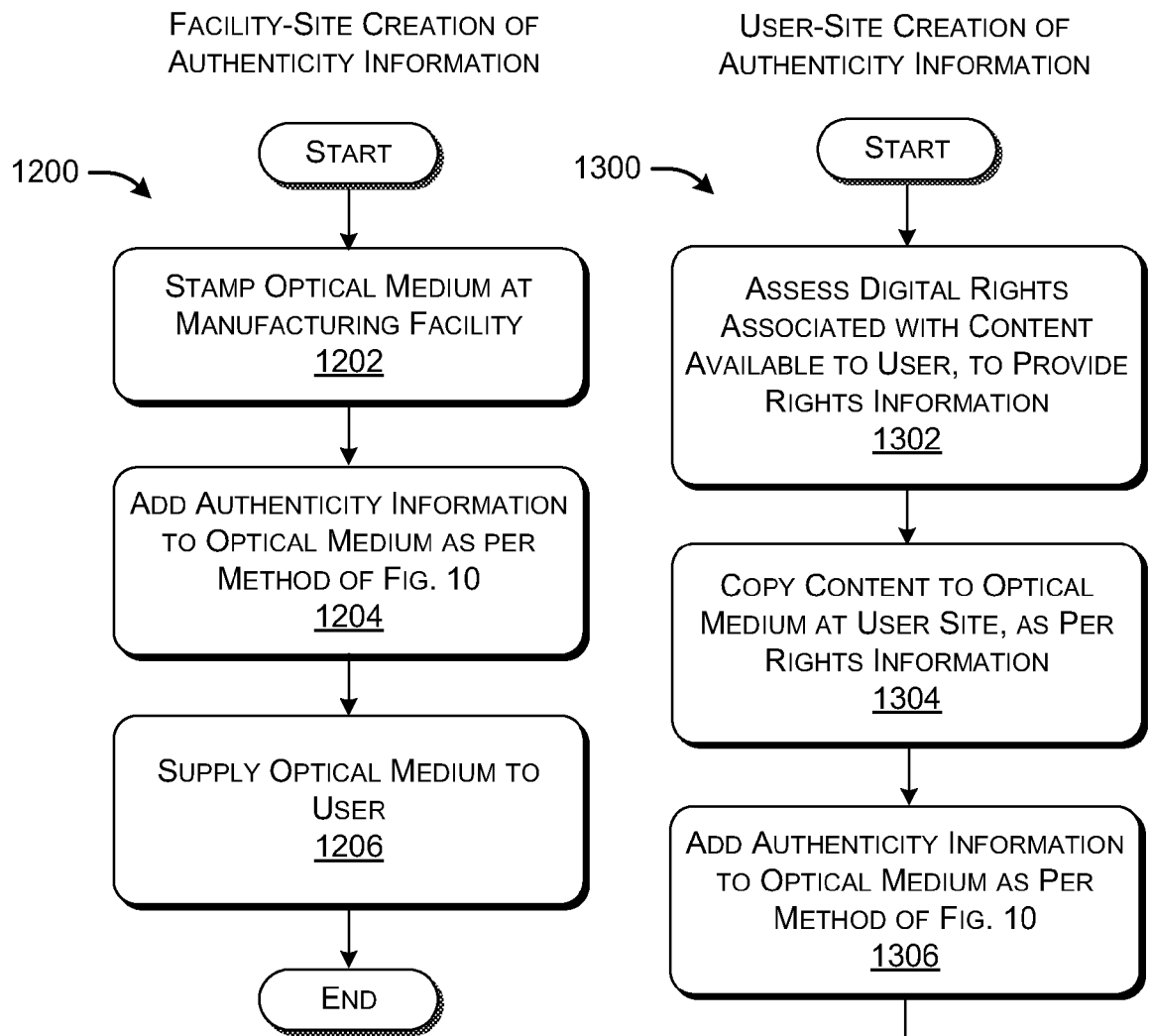

FIG. 12 shows a procedure 1200 for performing the method of FIG. 10 in the context of a stamping operation conducted within a manufacturing facility or the like. This procedure 1200 operates on non-recordable-type optical discs.

In block 1202, the descriptor printing component 108 stamps the optical disc 102 using a stamper in a known manner. Along with the whatever payload data is to be carried by the optical disc 102, the descriptor printing component 108 stamps the descriptor onto the optical disc 102.

In block 1204, the creation system 110 generates authenticity information in the manner described in FIG. 10 and adds the authenticity information to the optical disc 102, e.g., using Sony's Postcribed ID™ technology.

In block 1204, the optical disc 102 is supplied to an end-user.

FIG. 13 shows a procedure 1300 for performing the method of FIG. 10 in the context of a content-burning operation conducted at a user site or the like. This procedure 1300 can operate on recordable-type optical discs. In this procedure 1300, it is assumed that the user has rightful access to content, such as a movie, a game, software, etc. The user wishes to make an authentic copy of the content for her own use, or for others.

In block 1302, the creation system 110 can optionally consult a relevant authority to determine rights information pertaining to the copy operation. In one case, the creation system 110 can perform this function based on rights information which is encoded on the content that is being copied. Alternatively, or in addition, the creation system 110 can consult the remote entity 710 of FIG. 7 to make this determination, e.g., via the network 712.

The rights information may govern any aspect of the copying operation. For example, the rights information may describe whether copying is permitted, and under what conditions and terms the copying is permitted. The rights information may also describe the rights that will accrue to the recipient of the copy. In one case, the rights of the recipient of the copy may be the same as the user who is making the copy; in another case, the rights may differ in any way.

In block 1304, the creation system 110 can copy the content onto the optical disc 102 at the user site or other location, as governed by the rights information assessed in block 1302. The content includes the normal payload data along with the descriptor. (In this context, the descriptor printing component 108 can be considered as a part of the creation system 110.)

In block 1306, the creation system 110 can generate the authenticity information in the manner described above in FIG. 10 (e.g., by reading the descriptor information from the optical disc 102 and generating the reference descriptor information $f_{ref}$). The creation system 110 can optionally interact with the remote entity 710 or other appropriate agent in performing this task. For example, the creation system 110 can optionally provide the new signature for the copy in cooperation with the remote entity 710.

In block 1306, the creation system 110 also adds the authenticity information to the optical disc 102. In this case, the process of burning the payload data, burning the descriptor, generating the authenticity information, and burning the authenticity information can comprise a single integral process of burning the optical disc 102.

Generally, the procedure 1300 described above is an efficient way of copying content. A publisher can safely delegate the creation of copies to end-users, without incurring the costs of the production of the copies. Further, the publisher is not faced with the risk of making too many or two few copies, as the copying is performed on an on-demand basis, as driven, in distributed fashion, by the decisions of the end-users.

In effect, the copy operation described in procedure 1300 extends the licensing rights associated with one optical medium to one or more additional optical media, optionally altering the rights in any manner in the process. To this end, any administrative technology that is used to transfer licenses in other contexts can be integrated with the system 100.

Figure 14:
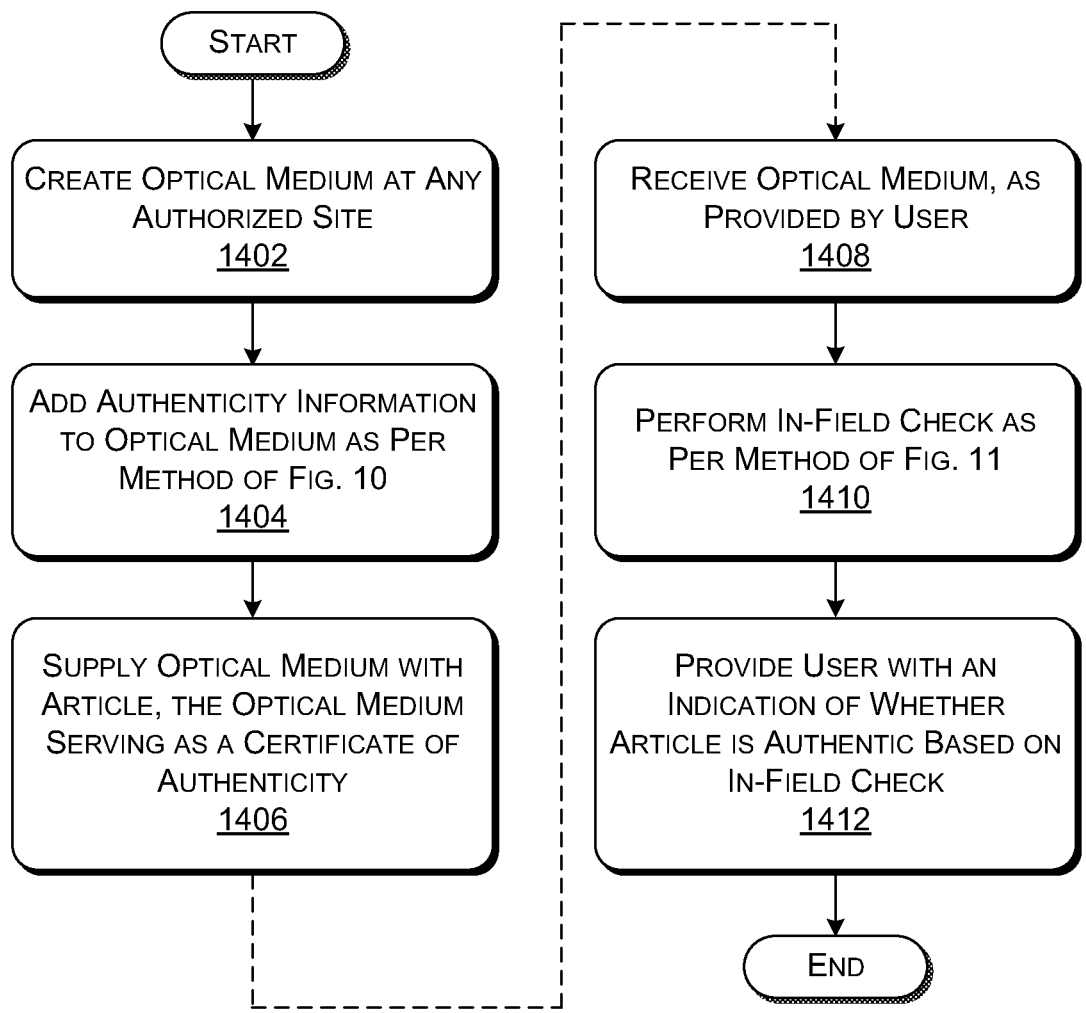
FIG. 14 shows an illustrative process in which an optical medium is used as a certificate of authenticity for another article.

FIG. 14 shows a procedure 1400 in which the optical disc 102 serves as a certificate of authenticity with respect to a separate article 130, rather than content provided on the optical disc 102 per se. The article 130 can correspond to any tangible or intangible asset, such as a computer, a piece of clothing, a legal document, and so on.

In block 1402, the system 100 creates the optical disc 102 at any authorized site, e.g., at a manufacturing facility or locally, at a user site or the like.

In block 1404, the system 100 adds authenticity information to the optical disc 102 using the approach of FIG. 10.

In block 1406, the procedure 1400 involves supplying the optical disc 102 to a user in conjunction with the article 130. For example, at a point of sale, a merchant can provide the user with the optical disc 102 as a certificate of authenticity for a product that is being purchased. The procedure 1400 can also involve sending the user the optical disc 102 by mail, courier, etc.

In block 1408, the checking system 118 receives the optical disc 102 that has been provided to the user.

In block 1410, the checking system 118 performs the validation tests set forth in FIG. 11. The user can perform this operation at the point of purchase (e.g., before purchase), or at a later time.

In block 1412, the checking system 118 provides the user with a result that indicates whether the optical disc 102 is valid, and, by implication, whether the article 130 is valid.

Figures 15, 16:
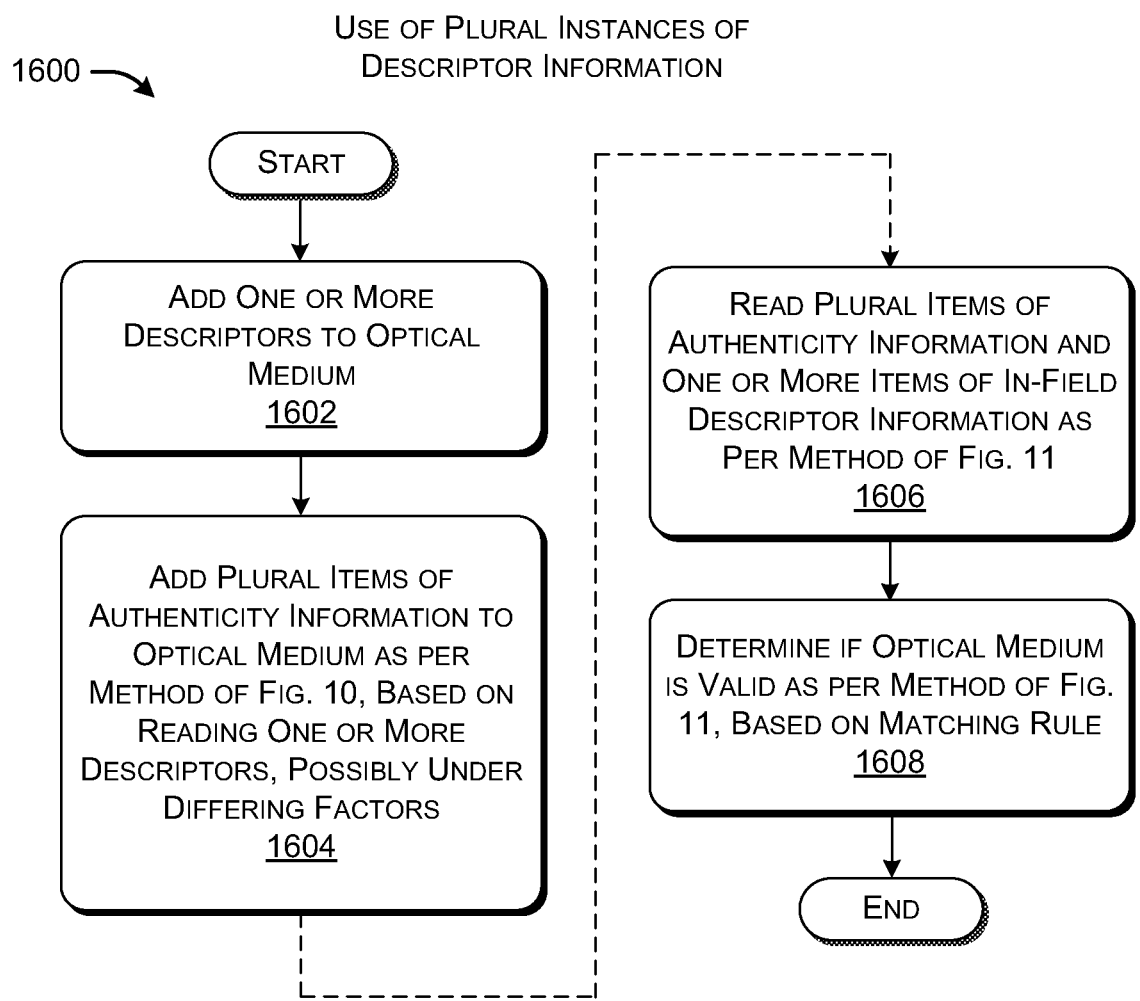
FIG. 15 shows an illustrative table that demonstrates how different items of descriptor information can be based on different descriptors and/or different environmental conditions.
FIG. 16 complements FIG. 15 by showing a process for validating an optical medium based on multiple instances of reference descriptor information.

The system 100 was described above in the context of the printing and reading of a single descriptor to generate a single instance of reference descriptor information $f_{ref}$. This approach can be extended in various ways. For example, FIG. 15 shows a table that indicates the possible use of plural descriptors, denoted by $D_1, D_2, \ldots D_n$. The table also shows plural items of descriptor information (f) that can be generated based on the plural descriptors, possibly based on different environmental conditions or aging models (denoted by A, B, C, etc.).

More specifically, in a first scenario, the descriptor printing component 108 prints two or more descriptors on the optical disc 102 within a single designated region, or possibly distributed over plural designated regions. Each descriptor has the characteristics described above; for instance, each descriptor is created with the intent of providing descriptor elements with indeterminacy-inducing lengths. In one case, all of the descriptors are identical. For example, all of the descriptors can include B elements, each having an indeterminacy-inducing length of 3.5 cycles. In another case, the descriptors are not the same. For example, some of the descriptors may include a collection of elements having an indeterminacy-inducing length of 3.5 cycles, and other descriptors may include a collection of elements having an indeterminacy-inducing length of 4.5 cycles.

The creation system 100 then reads the plural descriptors to produce plural items (or instances) of reference descriptor information, such as $f_{1A}$ produced by descriptor $D_1$, $f_{2A}$ produced by descriptor $D_2$, and so on. The creation system 110 individually signs each of the $f_{ref}$ instances to produce plural items (or instances) of authenticity information. In this process, the creation system 110 can optionally collate the text information with a subset of the $f_{ref}$ instances; indeed, in one case, the creation system 110 can incorporate the text information into only a single item of authenticity information. In other words, since the text is the same, redundant instances of the text can be eliminated or reduced. The creation system 110 then stores all of the items of authenticity information onto the optical disc 102 in any of the ways described above.

In a second scenario, the descriptor printing component 108 prints a single descriptor (e.g., $D_1$) onto the optical disc 102 in the manner described above. But instead of forming a single instance of reference descriptor information $f_{ref}$, the creation system 110 forms plural items of reference descriptor information (e.g., $f_{1A}$, $f_{1B}$, $f_{1C}$, etc.) based on different environmental conditions or aging models (A, B, C, etc.). For example, the creation system 110 can read the descriptor under different tilt conditions to produce the plural instances of $f_{ref}$, such as, without limitation, three different tilt conditions (e.g., $-\Delta$ tilt, 0 tilt, and $+\Delta$ tilt). A tilt condition describes an orientation of the laser beam with respect to the surface of the optical disc 102.

Alternatively, or in addition, the creation system 110 can form $f_{ref}$ under a general condition and then apply an aging model to this $f_{ref}$ to produce a particular instance of $f_{ref}$. The aging model can simulate an aging effect. It is also possible to use an aging model to produce a variable version of $f_{ref}$ that can dynamically assume slightly different values depending on measured environmental conditions in the field.

A third scenario can combine the features of the first scenario and the second scenario. Namely, as represented by the table of FIG. 15, the descriptor printing component 108 can print plural descriptors onto the optical disc 102. In addition, the creation system 110 can read one or more of these plural descriptors under different environmental conditions to provide plural items of reference descriptor information. For example, an item of reference information denoted by $f_{3B}$ corresponds to a reading of the third descriptor $D_3$ under environmental condition or aging model B.

The use of plural descriptors is potentially beneficial because it helps ensure that the checking system 118 can successfully recognize the optical disc 102 as being valid (if it is in fact valid) after undergoing the wear and tear of normal use. For example, during use of the optical disc 102, a scratch may damage one or more of the descriptors. But insofar as other descriptors are not damaged (which are possibly provided in other regions of the optical disc 102), the checking system 118 can still successfully process the optical disc.

Similarly, the formation of plural instances of $f_{ref}$ under different conditions or models helps counteract various effects of aging. Suppose, for instance, that the optical disc 102 undergoes some amount of warping due to exposure to elevated temperature or other environmental conditions. Suppose further that plural items of reference information were generated under different tilt conditions, either physical or modeled. After warping has taken place, the checking system 118 may be unsuccessful in matching $f_{field}$ with an instance of $f_{ref}$ formed under non-tilt conditions. But the checking system 118 may be successful in matching $f_{field}$ with an instance of $f_{ref}$ formed under a tilt condition; this is because the tilt condition may approximate the warp condition. In this sense, the formation of plural instances of $f_{ref}$ anticipates different circumstances in which the optical disc 102 may be read at some future point in time, possibly after undergoing wear and tear in the manner described above.

FIG. 16 shows a procedure 1600 which describes the principles discussed above in flowchart form.

In block 1602, the descriptor printing component 108 prints one or more descriptors, e.g., $D_1, D_2, \ldots D_n$.

In block 1604, the creation system 110 produces plural items of authenticity information based on one or more of the descriptors. The creation system 110 can optionally form these instances of authenticity information under different environmental conditions or models. The creation system 110 adds these plural items of authenticity information to the optical disc 102.

In block 1606, the checking system 118 reads the plural items of authenticity information that have been provided as per block 1604, which yields plural instances of $f_{ref}$. The checking system 118 also reads all of the descriptors that have been printed onto the optical disc 102 as per block 1602 to produce plural instances of $f_{field}$ (if, in fact, the optical disc 102 includes plural descriptors).

In block 1608, the checking system 118 determines whether the optical disc 102 is valid as per the two-phase test of FIG. 12. As to the descriptor-validation test, the checking system 118 determines whether the reference descriptor information matches the in-field descriptor information based on any type of matching rule. In one case, the checking system 118 determines that the optical disc 102 is valid if any instance of $f_{ref}$ matches any instance of $f_{field}$. The checking system 118 can compare the instances of $f_{ref}$ to corresponding counterpart instances of $f_{field}$, or it can compare all instances of $f_{ref}$ to all instances of $f_{field}$ without discrimination. In another case, the checking system 118 determines that the optical disc 102 is valid if an agreement between plural instances of $f_{ref}$ and plural instances of $f_{field}$ satisfies a specified matching threshold (e.g., specifying that T % of the instances should match). In one implementation, the checking system 118 can adjust the matching rule (including a matching threshold) based on one or more dynamic factors. For example, if the checking system 118 determines that warping has taken place, it can adopt a particular matching rule which attempts to counteract this effect, e.g., by providing a more liberal matching threshold, etc.

Finally, in the above description, the descriptor printing component 108 deliberately prints indeterminacy-inducing data-level regions. Alternatively, or in addition, the descriptor can be based, at least in part, on naturally occurring errors produced in the course of manufacturing the optical disc 102 (in a stamping process, a content-burning process, or in some other process). In this context, the descriptor printing component 108 is subsumed under the general functionality which prints the content.

The above-identified implementation can be explained by again making reference to FIG. 10. In block 1002, the operation of adding a descriptor to the optical disc 102 entails printing content on the optical disc 102. A subset of this data includes errors which can be mined to construct the descriptor.

In block 1004, the operation of reading the descriptor comprises searching the optical disc 102 for the presence of naturally-occurring indeterminacy-inducing regions. These are regions which produce indeterminate results upon repeated reading, in the manner described above. The creation system 110 can construct the reference descriptor information $f_{ref}$ based on these types of probabilistic descriptor elements. For example, the reference descriptor information can identify the positions of these elements on the optical disc 102. Alternatively, the reference descriptor information can also identify naturally occurring deterministic elements. Alternatively, or in addition, the reference descriptor information can also identify deliberately added descriptor elements. In one case, the creation system 110 searches for naturally-occurring descriptor elements over the entire content-bearing surface of the optical disc 102. In another case, the creation system 110 searches for naturally-occurring descriptor elements over a designated content-bearing portion of the optical disc 102. Still other variations are possible.

In block 1104 of the checking process, the checking system 118 reads the naturally-occurring descriptor elements in the same manner described above, to thereby construct $f_{field}$.

C. Representative Processing Functionality

FIG. 17 sets forth illustrative electrical data processing functionality 1700 that can be used to implement any aspect of the functions described above. With reference to FIG. 1, for instance, the type of processing functionality 1700 shown in FIG. 17 can be used to implement any aspect of the creation system 110, and/or any aspect of the checking system 118. In one case, the processing functionality 1700 may correspond to any type of computing device or optical medium player device.

The processing functionality 1700 can include volatile and non-volatile memory, such as RAM 1702 and ROM 1704, as well as one or more processing devices 1706. The processing functionality 1700 also includes various media devices 1708, such as a hard disk module, an optical disk module, and so forth. The processing functionality 1700 can perform various operations identified above when the processing device(s) 1706 executes instructions that are maintained by memory (e.g., RAM 1702, ROM 1704, or elsewhere). More generally, instructions and other information can be stored on any computer readable medium 1710, including, but not limited to, static memory storage devices, magnetic storage devices, optical storage devices, and so on. The term computer readable medium also encompasses plural storage devices. The term computer readable medium also encompasses signals transmitted from a first location to a second location, e.g., via wire, cable, wireless transmission, etc.

The processing functionality 1700 also includes an input/output module 1712 for receiving various inputs from a user (via input modules 1714), and for providing various outputs to the user (via output modules). One particular output mechanism may include a presentation module 1716 and an associated graphical user interface (GUI) 1718. The processing functionality 1700 can also include one or more network interfaces 1720 for exchanging data with other devices via one or more communication conduits 1722. One or more communication buses 1724 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for adding authenticity information to an optical medium to reduce counterfeit duplication of the optical medium, the method comprising:
   adding a descriptor having plural descriptor elements to the optical medium, the descriptor being produced with an intent of providing at least one data-level region having a length that produces indeterminate interpretations when read plural times;
   reading the descriptor from the optical medium and forming reference descriptor information based on the descriptor, the reference descriptor information including element type information which conveys whether each descriptor element associated with the descriptor is one of:
      a deterministic element, the interpretation of which is biased towards a single value; or
      a probabilistic element, the interpretation of which is not biased towards a single value;
   cryptographically signing the reference descriptor information to provide authenticity information; and
   performing physical modifications to the optical medium that add the authenticity information to the optical medium.

2. The method of claim 1, wherein said physical modifications add plural descriptors to the optical medium.

3. The method of claim 2, wherein:
   said reading of the descriptor comprises reading the plural descriptors to provide plural items of reference descriptor information and plural corresponding items of authenticity information, and
   said performing physical modifications comprises adding the plural corresponding items of authenticity information to the optical medium.

4. The method of claim 1, wherein:
   said reading of the descriptor comprises reading the descriptor based on at least two environmental conditions to provide at least two items of reference descriptor information and at least two corresponding items of authenticity information, and
   said performing physical modifications comprises adding the at least two corresponding items of authenticity information to the optical medium.

5. The method of claim 4, wherein said at least two environmental conditions correspond to two respective tilt conditions, each tilt condition corresponding to an orientation of a laser with respect to the optical medium.

6. The method of claim 1, wherein the method is performed in conjunction with a manufacturing operation in which the optical medium is created via a stamping process.

7. The method of claim 1, wherein the method is performed in conjunction with a burning operation in which content is added to the optical medium via a content-burning process.

8. The method of claim 1, further comprising supplying the optical medium with the authenticity information added thereto to a user in association with a separate article, the optical medium serving as a certificate of authenticity for the article.

9. The method of claim 1, further comprising, as a condition to providing the authenticity information:
   assessing digital rights associated with content that is accessible to a user, to provide rights information; and
   copying content onto the optical medium at a user site, as governed by the rights information,
   the method allowing the user to provide an authentic copy of the content, as governed by the rights information.

10. The method of claim 1, wherein the reference descriptor information comprises a vector that expresses the element type information as a set of data items, each data item having one of at least two values, a first value indicating that a corresponding descriptor element is deterministic or a second value indicating that the corresponding descriptor element is probabilistic.

11. The method of claim 1, wherein the reference descriptor information comprises a vector that expresses the element type information as a set of readings, each reading indicating a number of times a corresponding descriptor element has been interpreted as a particular value, which indicates, in turn, whether the corresponding descriptor element is deterministic element or probabilistic element.

12. The optical medium produced by the method of claim 1 having the descriptor and authenticity information thereon.

13. An optical medium having authenticity information added thereto to reduce counterfeit duplication of the optical medium, the optical medium comprising:
   a physical descriptor having plural descriptor elements added to the optical medium, the plural descriptor elements corresponding to data-level regions on the optical medium having lengths that produce indeterminate interpretations when read plural times;
   reference descriptor information based on the physical descriptor, the reference descriptor information reflecting characteristics of the plural descriptor elements corresponding to the data-level regions having the lengths that produce the indeterminate interpretations; and
   authenticity information, wherein the authenticity information comprises a cryptographic signature applied to the reference descriptor information.

14. The optical medium of claim 13, wherein the reference descriptor information includes element type information that identifies a first subset of the plural descriptor elements as deterministic elements and a second subset of the plural descriptor elements as probabilistic elements.

15. The optical medium of claim 13, wherein the reference descriptor information indicates numbers of times the data-level regions are interpreted as a given number of cycles.

16. The optical medium of claim 13, wherein the cryptographic signature comprises a signed hash of the reference descriptor information that is signed with a private key, the private key having a corresponding public key usable to decrypt the cryptographic signature.

17. The optical medium of claim 16, wherein the signed hash is a hash of a concatenation of the reference descriptor information and text associated with the optical medium.

18. The optical medium of claim 16, wherein the authenticity information comprises the signed hash and the reference descriptor information.

19. An optical disc having authenticity information added thereto to reduce counterfeit duplication of the optical disc, the optical disc comprising:
   a physical descriptor having plural descriptor elements added to the optical disc, the physical descriptor being produced by providing at least one data-level region having a length that produces indeterminate interpretations when read plural times;

reference descriptor information formed based on the physical descriptor, the reference descriptor information including element type information which conveys whether the plural descriptor elements are:
deterministic elements, or
probabilistic elements; and authenticity information, wherein the authenticity information comprises a cryptographical signature applied to the reference descriptor information.

20. The optical disc of claim 19, wherein the deterministic elements are relatively more likely than the probabilistic elements to consistently produce a single value when read multiple times.

* * * * *